(12) United States Patent
Takahashi

(10) Patent No.: US 8,307,304 B2
(45) Date of Patent: Nov. 6, 2012

(54) SCREEN PROCESSING APPARATUS, INFORMATION PROCESSING METHOD, AND COMPUTER PROGRAM PRODUCT

(75) Inventor: Hisanori Takahashi, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 883 days.

(21) Appl. No.: 12/379,918

(22) Filed: Mar. 4, 2009

(65) Prior Publication Data

US 2009/0228835 A1    Sep. 10, 2009

(30) Foreign Application Priority Data

Mar. 6, 2008 (JP) .................... 2008-056617
Jan. 29, 2009 (JP) .................... 2009-017664

(51) Int. Cl.
*G06F 3/048* (2006.01)

(52) U.S. Cl. ...................................... 715/826

(58) Field of Classification Search .............. 715/826
See application file for complete search history.

(56) References Cited

U.S. PATENT DOCUMENTS

| | | | |
|---|---|---|---|
| 2005/0206913 A1* | 9/2005 | Matsuda et al. ............... | 358/1.1 |
| 2007/0220484 A1 | 9/2007 | Takahashi et al. | |
| 2008/0134179 A1 | 6/2008 | Takahashi | |
| 2008/0301814 A1 | 12/2008 | Takahashi | |

FOREIGN PATENT DOCUMENTS

| | | | |
|---|---|---|---|
| JP | 11-212694 | * | 1/1998 |
| JP | 11-212694 | | 8/1999 |
| JP | 2002-152458 | * | 3/2001 |
| JP | 4136325 | | 6/2008 |
| JP | 4157376 | | 7/2008 |

OTHER PUBLICATIONS

Machine Translation of JP 2002-152458: Matsushma Hiroyuki "Software acquisition method and computer readable recording medium with program for allowing computer to execute the method recorded", publised May 24, 2002.*
Machine Translation of JP 11-212694: Sakakibara Hitoshi et al. "Information processing system" published Jun. 8, 1999.*
Abstract of JP 2002-152458 published May 24, 2002.
Abstract of JP 2004-213264 published Jul. 29, 2004.

* cited by examiner

*Primary Examiner* — Alvin Tan
*Assistant Examiner* — Rinna Yi
(74) *Attorney, Agent, or Firm* — Harness, Dickey & Pierce, P.L.C.

(57) ABSTRACT

A storage unit stores an item to be displayed on a display screen and a display order indicating a screen transition until a display of the display screen in a hierarchical structure. An input processing unit inputs screen definition data including an additional item to be added to the display screen and a display order for the additional item. A registering unit registers the display order and the additional item included in the screen definition data in the storage unit. A creating unit creates a display screen including a display order for the display screen and the item and the additional item associated with the display order in the storage unit.

9 Claims, 33 Drawing Sheets

FIG. 3

```xml
<?xml version="1.0" encoding="UTF-8"?>
<definition name="Display">
  <menu id="machine" type="category">                        ~308
    <property name="displayName" value="MACHINE" />          ~301
    <menu id="mail" type="major">                            ~309
      <property name="displayName" value="MAIL" />           ~302
      <menu id="smtp" type="minor">                          ~310
        <property name="displayName" value="SMTP" />         ~303
        <property name="userAdminAccessRight" value="r" />   ~305
        <property name="docAdminAccessRight" value="r" />    ~313
        <property name="machineAdminAccessRight" value="r" /> ~314
        <property name="operatorAccessRight" value="r" />    ~315
        <item id="server" type="input">                      ~311
          <property name="displayName" value="SMTP SERVER NAME" />  ~304
          <property name="inputType" value="string" />       ~306
          <property name="informationIdentifier" value="outputFilterMail.smtp.server" /> ~307
          <property name="userAdminAccessRight" value>"" />  ~312
          <property name="docAdminAccessRight" value="" />
          <property name="machineAdminAccessRight" value="r" />
          <property name="operatorAccessRight" value="" />
        </item>
      </menu>
    </menu>
  </menu>
</definition>
```

FIG. 4

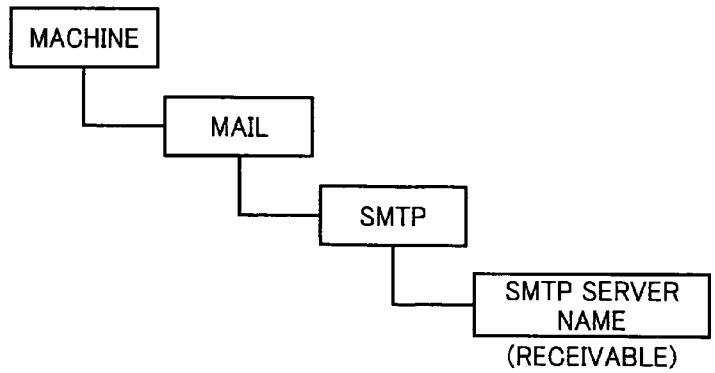

FIG. 5

```xml
<?xml version="1.0" encoding="UTF-8"?>
<definition name="configInformation">
  <component name="outputFilterMail" service="jp.co.company.outputFilterMail">  /501
    <category id="smtp">  502
      <spec id="server" type="string">  503
        <property name="initStringValue" value="" />  510
        <property name="minStringLength" value="0" />  504
        <property name="maxStringLength" value="128" />  505
        <property name="userAdminAccessRight" value="r" />  506
        <property name="docAdminAccessRight" value="r" />  507
        <property name="machineAdminAccessRight" value="rw" />  508
        <property name="operatorAccessRight" value="r" />  509
      </spec>
    </category>
  </component>
</definition>
```

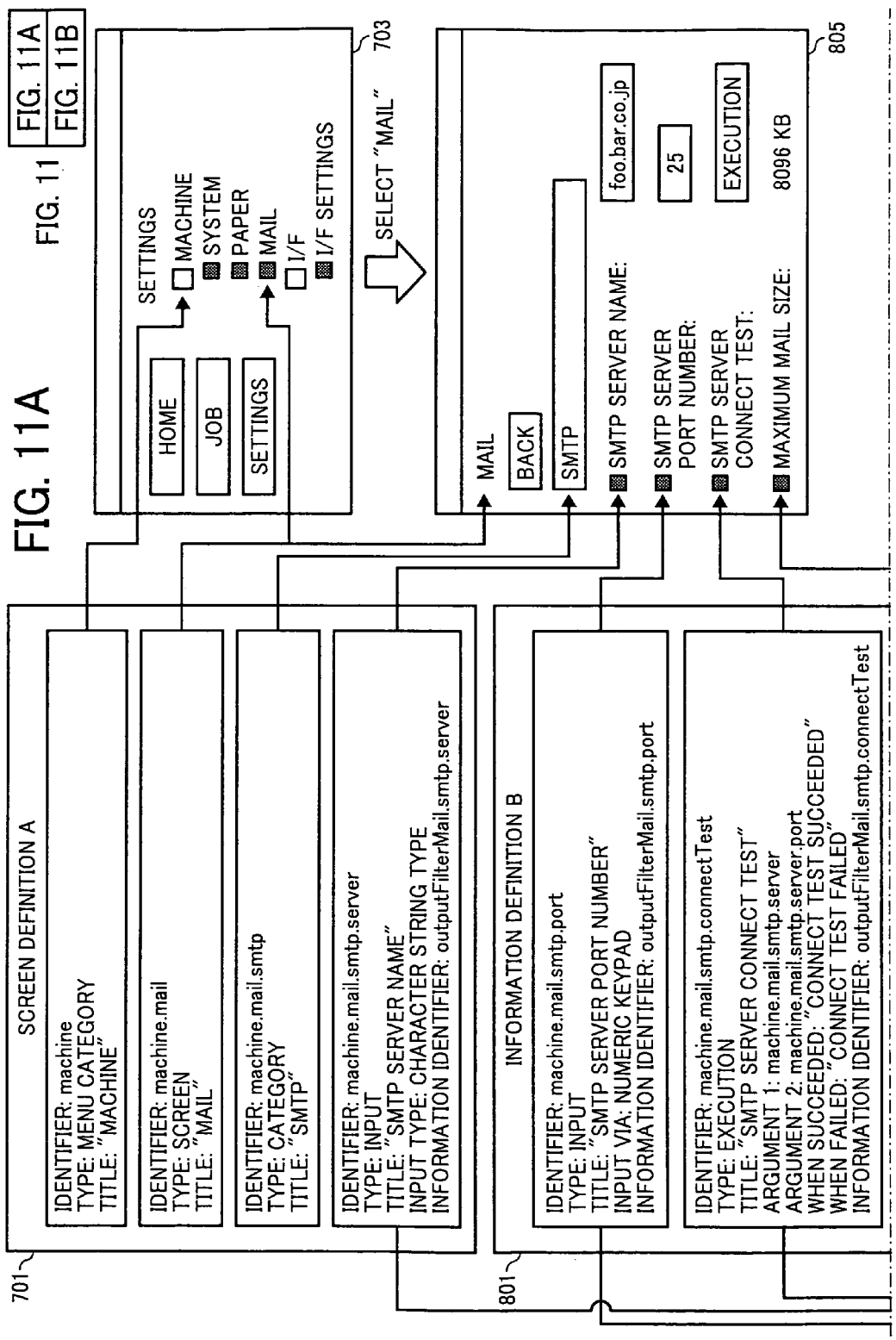

FIG. 27

MAIL
[BACK]

SMTP
_____

■ SMTP SERVER NAME:         [ foo.bar.co.jp ]

■ SMTP SERVER PORT NUMBER:  [ 25 ]

■ MAXIMUM MAIL SIZE:        [ 8096 ] kB

FIG. 28

MAIL
[BACK]

SMTP
_____

■ SMTP SERVER NAME:         foo.bar.co.jp

■ SMTP SERVER PORT NUMBER:  25

■ MAXIMUM MAIL SIZE:        8096 kB

FIG. 29

| ACCESS RIGHT MANAGEMENT | | | | |
|---|---|---|---|---|
| TYPE OF USER | USER ADMINISTRATOR | | OK | |
| MAIL | | | | |
| SMTP | ☑ REFERENCE | ☐ UPDATE | ☐ EXECUTION | ☐ ALL |
| POP | ☐ REFERENCE | ☐ UPDATE | ☐ EXECUTION | ☐ ALL |
| ACCOUNT | ☐ REFERENCE | ☐ UPDATE | ☐ EXECUTION | ☐ ALL |
| SYSTEM | | | | |
| POWER-SAVE MODE | ☐ REFERENCE | ☐ UPDATE | ☐ EXECUTION | ☐ ALL |

| AUTHORITY A-1:<br>USER ADMINISTRATOR | REFERENCE | | |
|---|---|---|---|
| AUTHORITY B-1:<br>USER ADMINISTRATOR | REFERENCE | UPDATE | |
| AND | REFERENCE | UPDATE | |

SCREEN PROCESSING APPARATUS, INFORMATION PROCESSING METHOD, AND COMPUTER PROGRAM PRODUCT

CROSS-REFERENCE TO RELATED APPLICATIONS

The present application claims priority to and incorporates by reference the entire contents of Japanese priority document 2008-056617 filed in Japan on Mar. 6, 2008 and Japanese priority document 2009-017664 filed in Japan on Jan. 29, 2009.

BACKGROUND OF THE INVENTION

1. Field of the Invention

The present invention relates to a technology for adding an item to a screen.

2. Description of the Related Art

A conventional setting screen through which a user inputs settings about an apparatus or an application is hard coded by a developer. When the developer adds a new function to the application or the application, the developer creates a new setting screen by adding an item for receiving settings about the new function to an existing setting screen.

On the other hand, when a user adds the new function to the apparatus or the application, the user cannot add the item to the existing setting screen that has been created by the developer. Even when a third vender adds the new function to the apparatus or the application, it is difficult to add the new item to the existing setting screen.

Some users create the new setting screen suitable for the new function from scratch instead of modifying the existing setting screen. However, from the user friendliness, the manner of adding the item corresponding to the new function to the existing setting screen is preferable.

Japanese Patent Application Laid-open No. H11-212694 discloses a conventional method of editing the setting screen. In the conventional method, each item included in the setting screen is set to either a display status or a hide status. If a function corresponding to a hidden item is added, the user will set the item to the display status to display the item on the setting screen.

However, in the conventional technology, the item of which the user can set the display/hide status is limited to items that are associated with the setting screen. When the new function is added, the user cannot display the item corresponding to the new function on the setting screen, because the new items are not associated with the setting screen. Accordingly, it is difficult to add the item corresponding to the new function to the existing setting screen.

SUMMARY OF THE INVENTION

It is an object of the present invention to at least partially solve the problems in the conventional technology.

According to one aspect of the present invention, there is provided a screen processing apparatus including a storage unit that stores therein an item to be displayed on a display screen and a display order indicating a screen transition until the display screen is displayed in a hierarchical structure in association with each other; an input processing unit that inputs screen definition data including an additional item to be added to the display screen and a display order until the additional item is displayed in the display screen; a registering unit that registers the display order and the additional item included in the screen definition data in the storage unit in association with each other; and a creating unit that creates a display screen including a display order representing the display screen and the item and the additional item associated with the display order in the storage unit.

Furthermore, according to another aspect of the present invention, there is provided a method of processing information in a screen processing apparatus including a storage unit that stores therein an item to be displayed on a display screen and a display order indicating a screen transition until the display screen is displayed in a hierarchical structure in association with each other. The method includes inputting screen definition data including an additional item to be added to the display screen and a display order until the additional item is displayed in the display screen; registering the display order and the additional item included in the screen definition data in the storage unit in association with each other; and creating a display screen including a display order representing the display screen and the item and the additional item associated with the display order in the storage unit.

Moreover, according to still another aspect of the present invention, there is provided a computer program product including a computer-usable medium having computer-readable program codes embodied in the medium for processing information in a screen processing apparatus including a storage unit that stores therein an item to be displayed on a display screen and a display order indicating a screen transition until the display screen is displayed in a hierarchical structure in association with each other. The program codes when executed cause a computer to execute inputting screen definition data including an additional item to be added to the display screen and a display order until the additional item is displayed in the display screen; registering the display order and the additional item included in the screen definition data in the storage unit in association with each other; and creating a display screen including a display order representing the display screen and the item and the additional item associated with the display order in the storage unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic diagram of an example of screen definition data;

FIG. 4 is a schematic diagram for explaining a concept of items to be displayed on a setting screen arranged in hierarchical structure in the screen definition data shown in FIG. 3;

FIG. 5 is a schematic diagram of an example of information definition data;

FIG. 27 is a schematic diagram of an exemplary setting screen for a machine administrator that is created by a screen creating unit according to the second embodiment;

FIG. 28 is a schematic diagram of an exemplary setting screen for a user administrator that is created by the screen creating unit according to the second embodiment;

FIG. 29 is a schematic diagram of an exemplary setting screen that is created by the screen creating unit for changing authority of each item according to the second embodiment;

FIG. 31 is a schematic diagram for explaining a concept of a result of an authority check performed by an authority check unit according to the second embodiment;

DETAILED DESCRIPTION OF THE PREFERRED EMBODIMENTS

Exemplary embodiments of the present invention are described in detail below with reference to the accompanying drawings.

A multi function peripheral (MFP) having various functions such as a copier, a facsimile machine, a printer, a scanner, and an image distributor (distributing an image that is obtained from an original by scanning or an image that is received, while being in the printer mode or the facsimile mode, from an external device) is used as an image processing apparatus according to any of the following embodiments.

Figure 1:
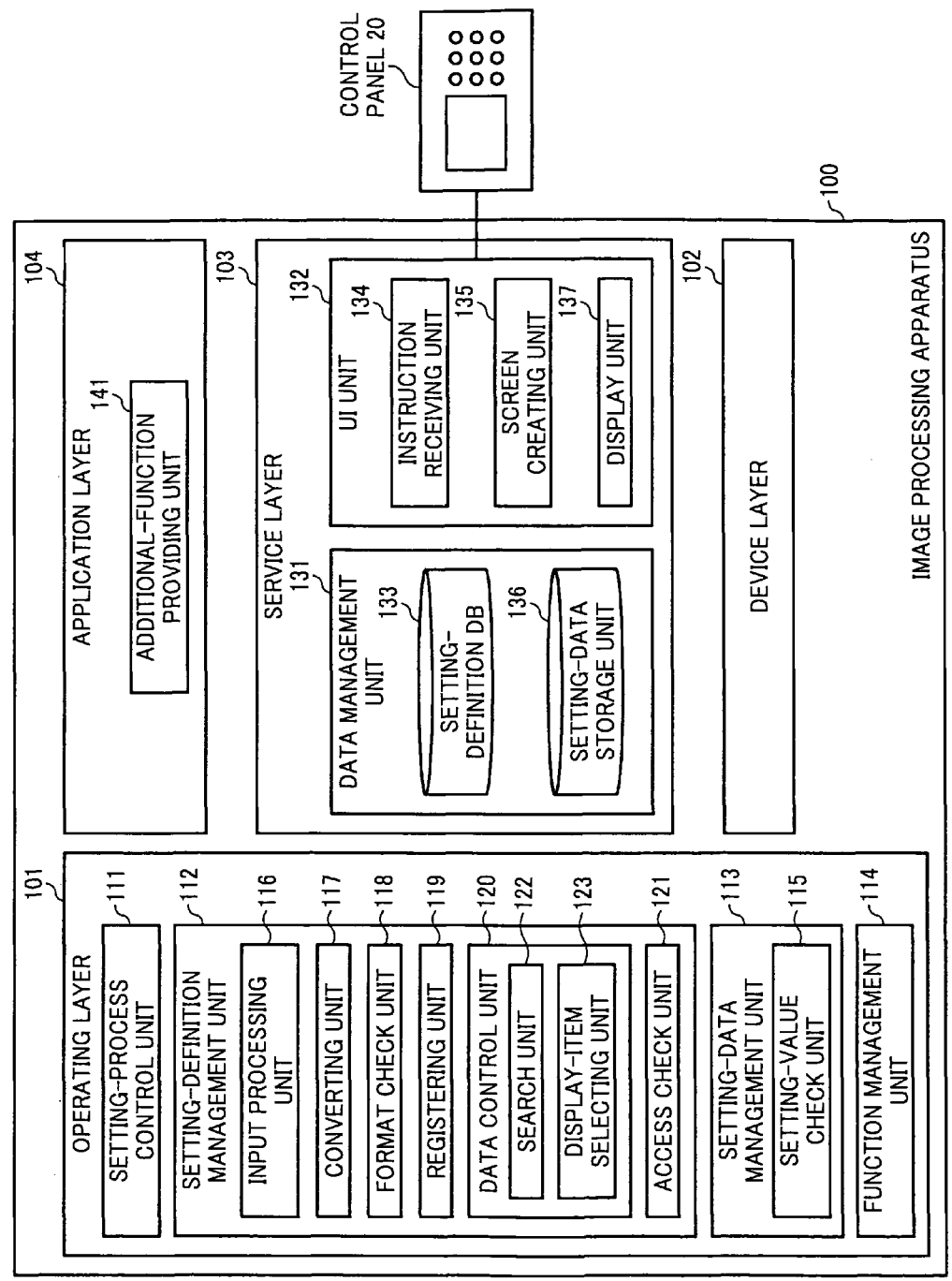
FIG. 1 is a block diagram of an image processing apparatus according to a first embodiment of the present invention.

FIG. 1 is a block diagram of an image processing apparatus 100 according to a first embodiment of the present invention. The image processing apparatus 100 includes an operating layer 101, a device layer 102, a service layer 103, and an application layer 104. The image processing apparatus 100 processes received image data, and displays a setting screen including items related to the data processing. The image processing apparatus 100 is connected to a control panel 20. A user operates the image processing apparatus 100 via the control panel 20.

In the first embodiment, an item is added to a setting screen through which settings necessary for an application that is included in the image processing apparatus 100 are received. Although the setting screen is used as an example of a display screen in the following description, it is allowable to use some other display screens through which the user inputs settings of some other items.

Figure 2:
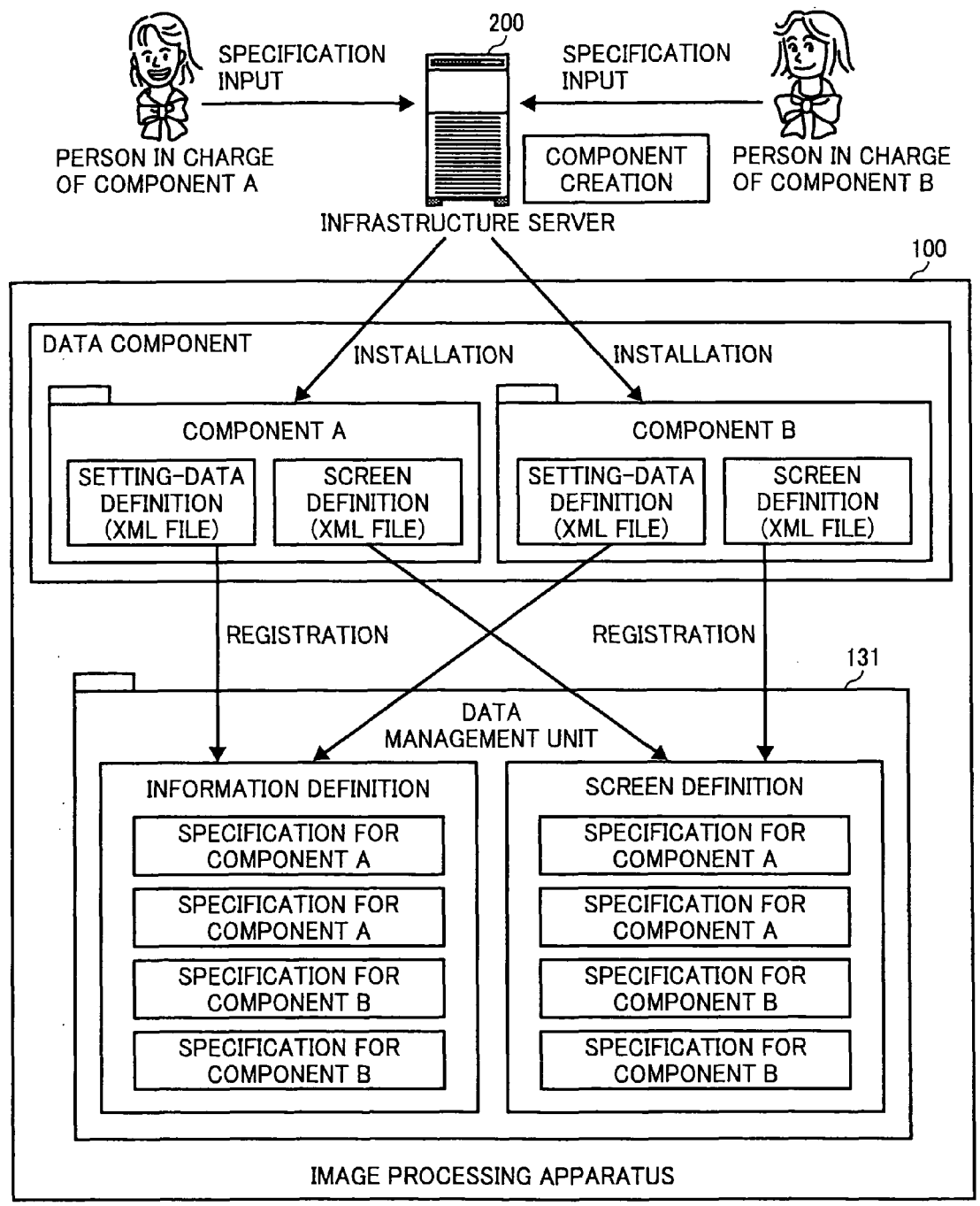
FIG. 2 is a schematic diagram for explaining a concept of component addition with the image processing apparatus shown in FIG. 1.

FIG. 2 is a schematic diagram for explaining a concept of component addition with the image processing apparatus 100. As shown in FIG. 2, when a component for implementing a new function is developed with an infrastructure server 200, the user inputs specifications of a setting screen for the component.

More particularly, the user inputs screen specifications and information specifications as the specifications of the setting screen. The screen specifications are information to be used for displaying target items on the setting screen. On the other hand, the information specifications are not information to be displayed on the setting screen. The information specifications are used when the component performs a certain process related to the item.

The infrastructure server 200 creates screen definition data including at least one screen specification and information definition data including at least one information specification. The infrastructure server 200 embeds the created information definition data and the created screen definition data into the component to be added to the image processing apparatus 100. The component to be added can be described in any file format including the JAR format. If the component is described in the JAR format, the information definition data and the screen definition data is storable as an extensive markup language (XML) file.

The screen definition data in the first embodiment is an XML-based data including a plurality of screen specifications arranged in a hierarchical structure that represents an order of setting screens to be displayed and a layer to which each item on the setting screen is assigned. FIG. 3 is a schematic diagram of an example of the screen definition data. The screen definition data includes a plurality of tags. If an attribute "name" of a tag "property" is "displayName", then an attribute "value" of the tag "property" indicates the name of the setting screen. For example, the attribute "value" of a tag 301, which is the tag "property", includes "machine" as the name of the setting screen. Moreover, the attribute "value" of a tag 302, which is also the tag "property", includes "mail" as the name of the setting screen. Furthermore, the attribute "value" of a tag 303, which is also the tag "property", includes "SMTP" as the name of the setting screen. Still moreover, the attribute "value" of a tag 304, which is also the tag "property", includes "SMTP server name" as the name of the setting screen.

In the setting screen data shown in FIG. 3, an available action is defined on an item-to-item basis corresponding to authority of the user. For example, according to a tag 305, if the user has "userAdminAccessRight" (user administration access right), the user can execute "r" (reference) only. An available action corresponding to another type of the authority is defined in the same manner. In this manner, the image processing apparatus 100 sets, on the user basis, the item to be displayed on the setting screen and the settable item according to the screen definition data. The available action includes "r" (reference), "w" (update) and "x" (execution).

A tag 306 indicates that the item is to receive an input of a character string. Therefore, a character string is received as the SMTP server name. A tag 307 is an information specification identifier for identifying the item. The information specification identifier is used for identifying a corresponding information specification from among the information specifications stored in the information definition data.

FIG. 4 is a schematic diagram for explaining a concept of the items to be displayed on the setting screen arranged in the hierarchical structure in the screen definition data shown in FIG. 3. As shown in FIG. 4, the items "machine", "mail", "SMTP", and "SMTP server name" are arranged in the screen definition data shown in FIG. 3 in the hierarchical structure in this order.

The information definition data in the first embodiment is XML-based data including a plurality of information specifications. FIG. 5 is a schematic diagram of an example of the information definition data. A tag 501 defines an associated component. The information specification identifier that is used for identifying information specification corresponding to the item associated with the property included in a tag 503 is an identifier "outputFilterMail.smtp.server". This identifier is obtained by combining information included in the tag 501, a tag 502, and the tag 503. In the information specifications, an allowable range of each item is defined. For example, a tag 504 defines a minimum length of characters, and a tag 505 defines a maximum length of characters. Tags 506 to 509 define an available action and the authority corresponding to the action. If "value" is "r", the user can execute reference. If "value" is "w", the user can execute update.

The information definition data in the first embodiment includes therein a plurality of information specifications in a parallel structure.

Referring back to FIG. 2, the infrastructure server 200 sends components A and B each including the information definition data and the screen definition data to the image processing apparatus 100.

Upon receiving the components A and B, the operating layer 101 installs the components A and B in an owner component (not shown) stored in the application layer 104. Through the installation, the information definition data and the screen definition data in the components A and B are registered in a data management unit 131 of the service layer 103. Thus, it is ready to dynamically change the setting screen of the image processing apparatus 100 and items and details of each item that are displayed on the setting screen. The user can create his setting screen as appropriately.

As shown in FIG. 1, the application layer 104 stores therein various applications (components) including an additional-function providing unit 141 that allow the user to operate the image processing apparatus 100. The components stored in the application layer 104 send, to the service layer 103, various instructions such as an instruction for processing execution and an instruction to acquire a processing result as appropriately.

The additional-function providing unit 141 is installed to provide the user various functions. The additional-function providing unit 141 is a plug-in component attached to the owner component. The user can attach or detach the additional-function providing unit 141 to or from the image processing apparatus 100, as appropriately.

The service layer 103 includes an application program interface (API) that receives processing requests from the applications of the application layer 104. The service layer 103 includes the data management unit 131 and a user interface (UI) unit 132.

The data management unit 131 includes a setting-definition database (DB) 133 and a setting-data storage unit 136. The data management unit 131 manages data to be used for creating the setting screen.

The setting-definition DB 133 stores therein all the screen specification data that is extracted from the screen definition data and the information specification data that is extracted from the information definition data. The setting-definition DB 133 in the first embodiment is an object oriented database (OODB). The setting-definition DB 133 stores therein the screen specification data that is converted to form a predetermined class structure and the information specification data.

Figure 6:
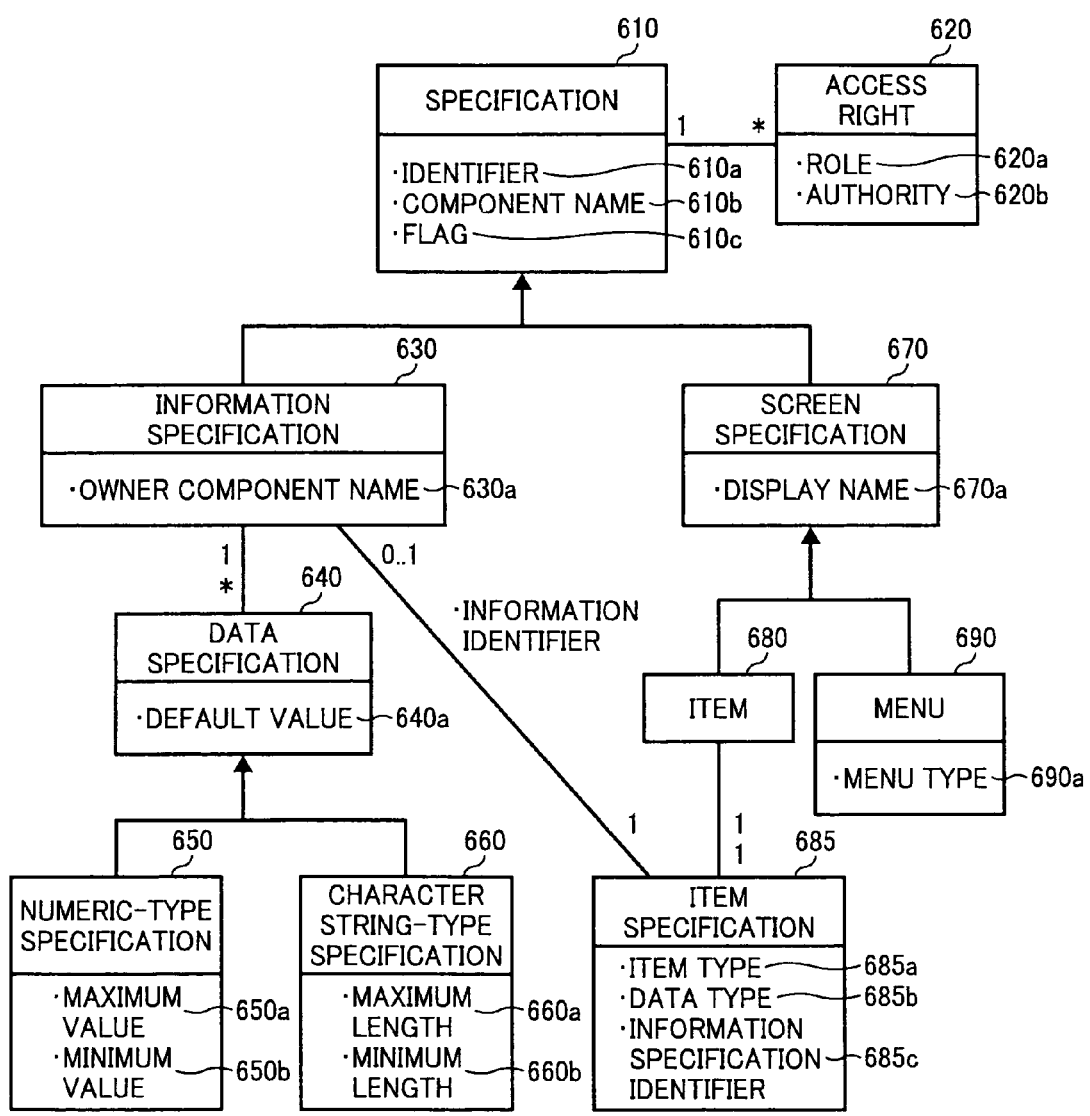
FIG. 6 is a block diagram for explaining class structure of a setting-definition DB.

FIG. 6 is a block diagram for explaining the class structure of the setting-definition DB 133. The setting-definition DB 133 includes a specification class 610, an access-right class 620, an information specification class 630, a data specification class 640, a numeric-type specification class 650, a character string-type specification class 660, a screen specification class 670, an item class 680, an item-specification class 685, and a menu class 690.

Each of blocks representing those classes includes an upper block and a lower block. The upper block includes the name of the class, therefore called "name block". The lower block includes data (attributes) of the class, therefore called "attribute block". In a case of the specification class 610, for example, the name block indicates that the name of the specification class 610 is "specification"; and the attribute block indicates that the specification class 610 includes "identifier", "component name", and "flag" as attributes.

Those classes shown in FIG. 6 are described in details below. The specification class 610 represents a specification stored in the setting-definition DB 133. The specification for the specification class 610 can be either the screen specification or the information specification. The specification class 610 includes an identifier 610a, a component name 610b, and a flag 610c as attributes.

The identifier 610a is an attribute for identifying the specification (the screen specification or the information specification). If the specification is the information specification, the identifier 610a is the above-described information specification identifier. The identifier 610a is described hierarchically. For example, an identifier "machine.mail" means that this identifier is used for identifying the specification in a layer lower than a specification corresponding to an identifier "machine". In other words, the hierarchical structure of the screen specification defined in the XML format maintains by the hierarchical identifier.

The component name 610b includes the name of the component associated with the specification. The flag 610c indicates whether the item identified by the specification is to be displayed on the setting screen.

The access-right class 620 manages a right to access the item defined by the specification. More particularly, the access-right class 620 includes a role 620a and an authority 620b. The role 620a indicates a user's role (e.g., user administrator). The authority 620b indicates authority corresponding to the role 620a (e.g., reference, update, and execution).

The information specification class 630 manages the information specification. More particularly, the information specification class 630 includes an owner component name 630a as an attribute. The owner component name 630a indicates the name of the owner component.

The data specification class 640 manages data related to the information specification. More particularly, the data specification class 640 includes a default value 640a as an attribute. The default value 640a indicates a default value of the item defined by the information specification.

The numeric-type specification class 650 limits a range of allowable numeric values that are receivable as a parameter of the item. More particularly, the numeric-type specification class 650 includes a maximum value 650a and a minimum value 650b as attributes. The maximum value 650a indicates the upper limit of the allowable numeric values. The minimum value 650b indicates the lower limit of the allowable numeric values.

The character string-type specification class 660 limits an allowable length of a character string that is receivable as a parameter of the item. More particularly, the character string-type specification class 660 includes a maximum length 660a and a minimum length 660b as attributes. The maximum length 660a indicates the upper limit of the allowable length of the character string. The minimum length 660b indicates the lower limit of the allowable length of the character string.

The screen specification class 670 manages the screen specification. More particularly, the screen specification class 670 includes a display name 670a. The display name 670a indicates a display name of the item defined by the screen specification.

The item class 680 manages the item defined by the screen specification.

The item-specification class 685 manages item specifications. More particularly, the item-specification class 685 includes an item type 685a, a data type 685b, and an information specification identifier 685c as attributes. The item type 685a indicates a type of the item to be displayed (e.g., direct input or select input). The data type 685b indicates a type of data (e.g., numeric type or character string type) of the item. The information specification identifier 685c is used for identifying the information specification.

The menu class 690 manages a type of a menu of the screen specification. More particularly, the menu class 690 includes a menu type 690a as an attribute. The menu type 690a indicates the type of the menu of the screen specification.

The relation among those classes shown in FIG. 6 is described below. A line connecting two blocks representing any two classes indicates that the two classes are associated with each other. A text near the line beside one of the classes indicates a role or a position of the class viewed from the other class. Numbers or symbols near the line beside the two classes indicate a degree of multiplexing between the two classes, i.e., a correspondence relation in the number of objects between the two classes.

The relation between the specification class 610 and the access-right class 620 is described below. The access-right class 620 manages the access right for each specification defined by the specification class 610.

The relation among the information specification class 630, the screen specification class 670, and the specification class 610 is described below. The information specification class 630 and the screen specification class 670 are inheritances of the specification class 610.

The item class 680 is an inheritance of the screen specification class 670. The item class 680 is associated with the item-specification class 685 in a one-to-one manner. The item-specification class 685 is associated with the information specification class 630. Those classes are associated with each other by the information specification identifier 685c. In this manner, an item to be displayed is associated with detail data of the item.

The detail data is attribute data of the item. A value of the detail data, which is set by the user, is used when the component perform a certain process.

The setting-definition DB 133 in the first embodiment stores therein all the items of the setting screen and the detail data of each item to be used for performing a process with the item. The setting-definition DB 133 stores therein the identifiers and the items in a correspondence manner. The identifier teaches an order of screens to be displayed before the target setting screen including the corresponding item, and a hierarchical layer of the corresponding item in the display screen. The setting screen on which the item is to be displayed and the layer of the setting screen are identifiable by the identifier.

Thus, it is possible to add, update, or delete an item to be displayed on the setting screen and the detail data of the item by adding, updating, or deleting an entry of the setting-definition DB 133. Moreover, because the setting-definition DB 133 manages all the items, the items are always consistent.

In the image processing apparatus 100 according to the first embodiment, because the setting-definition DB 133 manages all of the screen specifications and the information specifications that can be shared by two or more setting screens, contents of the specifications are always consistent.

Moreover, because the setting-definition DB 133 stores therein all of the screen specifications and the information specifications, which can be shared by two or more setting screens, that are classified as shown in FIG. 6, an access to each item can be controlled properly based on a consistent policy.

The setting-data storage unit 136 shown in FIG. 1 stores therein the setting data of each item.

The setting-definition DB 133 and the setting-data storage unit 136 can be stored in any of widely-used storage units such as a hard disk drive (HDD), an optical disc, a memory card, and a random access memory (RAM).

The device layer 102 controls devices of the image processing apparatus 100 in response to instructions received from the service layer 103.

The operating layer 101 includes a setting-process control unit 111, a setting-definition management unit 112, a setting-data management unit 113, and a function management unit 114. The operating layer 101 manages operation of the device layer 102, the service layer 103, and the application layer 104.

The function management unit 114 installs a component in the application layer 104 and uninstalls the component from the application layer 104. The setting-definition management unit 112 of the operating layer 101 processes the screen definition data and the information definition data extracted from the installed component.

The setting-process control unit 111 receives a request from the user via the UI unit 132. Upon receiving the request from the UI unit 132, the setting-process control unit 111 sends a processing execution instruction corresponding to the received request to at least one of the setting-definition management unit 112 and the setting-data management unit 113.

The setting-data management unit 113 includes a setting-value check unit 115. The setting-data management unit 113 provides means for referring or changing setting values stored in the setting-data storage unit 136.

When the setting-data management unit 113 receives a new setting value for update, the setting-value check unit 115 checks whether the new setting value is in the range of the allowable values by referring to the setting-definition DB 133. More particularly, the setting-value check unit 115 refers to the maximum value 650a and the minimum value 650b of the numeric-type specification class 650 or the maximum length 660a and the minimum length 660b of the character string-type specification class 660. If the new setting value is out of the range of the allowable values, the setting-data management unit 113 stops updating the target item with the new setting value.

In the image processing apparatus 100, the maximum value and the minimum value are stored in numeric specification objects as entities of the numeric-type specification class 650, and the maximum length and the minimum length are stored in character string-type specification objects as entities of the character string-type specification class 660 in the same manner as the class structure shown in FIG. 6. The setting-value check unit 115 checks whether the setting value received from the user is valid by referring to those objects. Thus, the image processing apparatus 100 can stop the user inputting an invalid setting value.

The setting-definition management unit 112 includes an input processing unit 116, a converting unit 117, a format check unit 118, a registering unit 119, a data control unit 120, and an access check unit 121. The setting-definition management unit 112 provides means for registering an entry in the setting-definition DB 133 of the data management unit 131, referring to entries stored in the setting-definition DB 133, searching the setting-definition DB 133 for an entry, and deleting an entry from the setting-definition DB 133.

The input processing unit 116 receives the screen definition data and the information definition data extracted from the component that is received by the operating layer 101.

The converting unit 117 converts the XML-based screen definition data and the XML-based information definition data into data based on a format registerable in the setting-definition DB 133.

For example, the converting unit 117 creates, by referring to the attribute of the tag included in the screen definition data, the identifier of each item in such a manner that the identifier represents the order of screens to be displayed before the target setting screen including the corresponding item and the hierarchical layer of the corresponding item in the display screen. More particularly, the converting unit 117 creates the identifier 610a of the specification class 610 shown in FIG. 6 by combining the attribute "id" in the tag "menu" and the attribute "id" in the tag "item" shown in FIG. 3.

Figure 7:
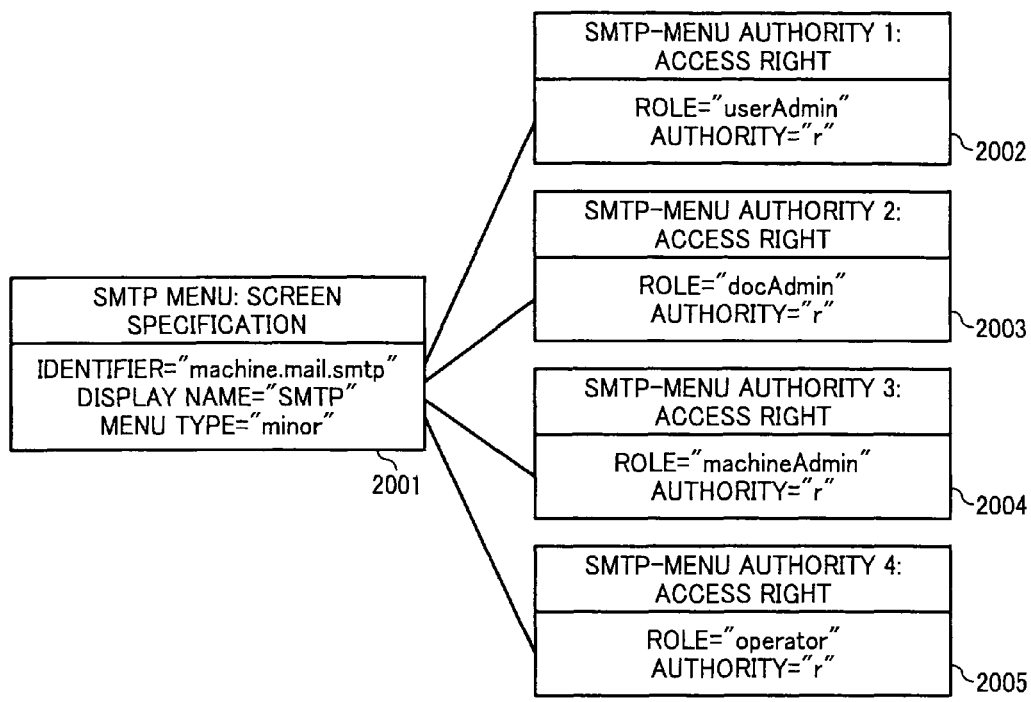
FIG. 7 is a schematic diagram of a first example of class instances that are converted by a converting unit from screen specifications included in the screen definition data.

FIG. 7 is a schematic diagram of a first example of class instances that are converted by the converting unit 117 from the screen specifications included in the screen definition data. As shown in the first example of FIG. 7, the converting unit 117 creates the identifier 610a of the item "SMTP" by combining the attribute "id" in a tag 308, the attribute "id" in a tag 309, and the attribute "id" in a tag 310. Thus, the identifier "machine.mail.smtp" is obtained. The converting unit 117 then sets the identifier "machine.mail.smtp" as a class instance 2001. The converting unit 117 creates class instances 2002, 2003, 2004, and 2005 from the tag 305, a tag 313, a tag 314, and a tag 315 shown in FIG. 3, respectively. In this manner, the image processing apparatus 100 maintains the hierarchical structure in the received XML file by using the identifier in the setting-definition DB 133.

Figure 8:
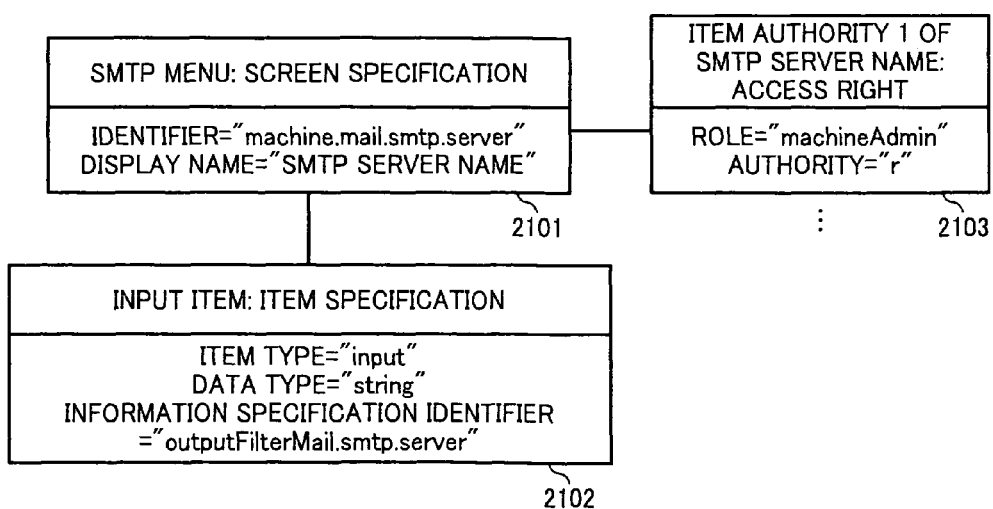
FIG. 8 is a schematic diagram of a second example of class instances that are converted by the converting unit from the screen specifications included in the screen definition data.

FIG. 8 is a schematic diagram of a second example of class instances that are converted by the converting unit 117 from the screen specifications included in the screen definition data. As shown in the second example of FIG. 8, the converting unit 117 creates, as the identifier of the item "SMTP server name", an identifier "machine.mail.smtp.server" by combining the attribute "id" in the tag 308, the attribute "id" in the tag 309, the attribute "id" in the tag 310, and the attribute "id" in a tag 311, and sets the created identifier as a class instance 2101. The converting unit 117 sets the value "SMTP server name" in the tag 304 shown in FIG. 3 as the display name 670a of the screen specification class 670.

The converting unit 117 sets attributes of a class instance 2102 as an entity of the item-specification class 685 by referring to the tag 306 shown in FIG. 3. The converting unit 117 further sets attributes of a class instance 2103 as an entity of the access-right class 620 by referring to a tag 312 etc.

After that, the converting unit 117 sets the information specification identifier of the class instance 2102 by referring to the tag 307 shown in FIG. 3. Thus, the class instance 2102 is associated with the information specification class corresponding to the item "SMTP server name".

Figure 9:
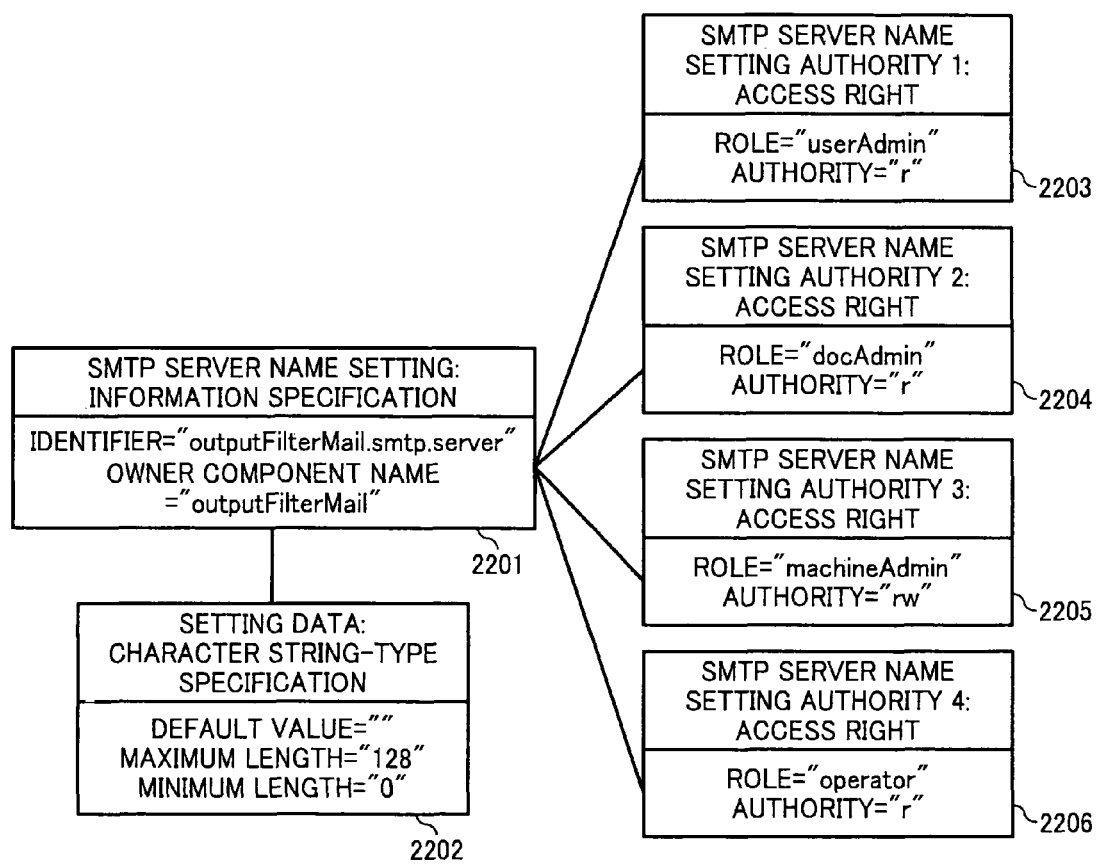
FIG. 9 is a schematic diagram of an example of class instances that are converted by the converting unit from information specifications included in the information definition data.

FIG. 9 is a schematic diagram of an example of class instances that are converted by the converting unit 117 from the information specifications included in the information definition data. As shown in the example of FIG. 9, the converting unit 117 creates, as the identifier of the item "SMTP server name setting", an identifier "outputFilterMail.smtp.server" by combining the attribute "name" in the tag 501, the attribute "id" in the tag 502, and the attribute "id" in the tag 503 shown in FIG. 5, and sets the created identifier as a class instance 2201. The converting unit 117 creates a class instance 2202 from a tag 510, the tag 504, and the tag 505 shown in FIG. 5. The converting unit 117 creates class instances 2203 to 2206 from the tags 506 to 509, respectively.

If necessary data is not found in any of the screen specifications included in the screen definition data and the information specifications included in the information definition data, the converting unit 117 sets the default value corresponding to the attribute.

Referring back to FIG. 1, the format check unit 118 checks whether the screen definition data and the information definition data converted by the converting unit 117 satisfy a predetermined format, i.e., are ready to be registered in the setting-definition DB 133. More particularly, the format check unit 118 compares the converted screen definition data and the converted information definition data to the class structure shown in FIG. 6.

If it is determined that the converted screen definition data and the converted information definition data satisfy the predetermined format, the registering unit 119 registers the converted screen definition data and the converted information definition data in the setting-definition DB 133. In other words, after the screen specification is converted by the converting unit 117, the registering unit 119 registers the converted screen specification to be added on the item-to-item basis in the setting-definition DB 133. Eventually, each item included in the screen specifications is associated with the corresponding identifier. The identifier teaches an order of screens to be displayed before the target setting screen including the corresponding item, and a hierarchical layer of the corresponding item in the display screen. Therefore, the setting screen on which the item is to be displayed and the layer of the setting screen are identifiable by the identifier.

The registering unit 119 registers the item to be added and a display order indicated by the identifier in the setting-definition DB 133 in the correspondence manner. Eventually, existing items and newly added items are present in the setting-definition DB 133 corresponding to the display orders.

The data control unit 120 includes a search unit 122 and a display-item selecting unit 123. The data control unit 120 refers to, updates, and deletes items stored in the setting-definition DB 133.

The search unit 122 searches the setting-definition DB 133 for an entry satisfying conditions received from the user (e.g., an entry including a predetermined character string). The order of screens to be displayed including a search screen will be described later.

The conventional image processing apparatus also has the search function. However, because search results are hard coded, it is impossible to use the search function with an additionally installed component.

The display-item selecting unit 123 selects an item to be displayed in the process of creating the setting screen. More particularly, the display-item selecting unit 123 selects, by referring to the identifiers stored in the setting-definition DB 133, items on a certain layer(s). From which layer the items are to be selected is predetermined corresponding to the setting screen. After that, the data control unit 120 acquires the screen specification of the selected items. Thus, a screen creating unit 135 creates desired screen data.

In the image processing apparatus 100 according to the first embodiment, the setting-definition DB 133 stores therein all of the screen specifications and the information specifications that can be shared by two or more setting screens, the search unit 122 can identify the target item in the simple manner even as the function related to the additionally installed component.

The access check unit 121 checks, on the item-to-item basis, whether the user is authorized to access the item to be displayed on the setting screen or the search result screen. More particularly, the access check unit 121 refers to the setting-definition DB 133 of the data management unit 131 on the item-to-item basis, and checks a type of authority, such as "reference", "input", and "execution", corresponding to the user. The access check unit 121 refers to, more particularly, an object as an entity of the access-right class 620 shown in the class structure of FIG. 6.

In the image processing apparatus 100 according to the first embodiment, the setting-data storage unit 136 stores therein all the setting data (e.g., setting values) on the item-to-item basis, and the setting-data management unit 113 performs all the processes related to the setting-data storage unit 136. With this configuration, it is possible to refer to the setting data of the target item only by sending a reference request including the identifier for identifying the target item. In this manner, a first component installed in the image processing apparatus 100 can refer to even the setting data for a second component in a simple manner.

It is noted that, to refer to the setting data for the second component, the first component needs information about the identifiers corresponding to the items for the second component.

The UI unit 132 includes an instruction receiving unit 134, the screen creating unit 135, and a display unit 137. The UI unit 132 provides the screen to be displayed on the control panel 20. Through the screen, the UI unit 132 receives various instructions from the control panel 20.

The instruction receiving unit 134 receives inputs of various instructions from the user via the control panel 20.

The screen creating unit 135 creates the screen data to be displayed on the control panel 20. In the first embodiment, the screen creating unit 135 creates the setting screen data for the component installed in the image processing apparatus 100. The screen creating unit 135 creates the setting screen data from data stored in the setting-definition DB 133 and the setting-data storage unit 136.

Figure 10:
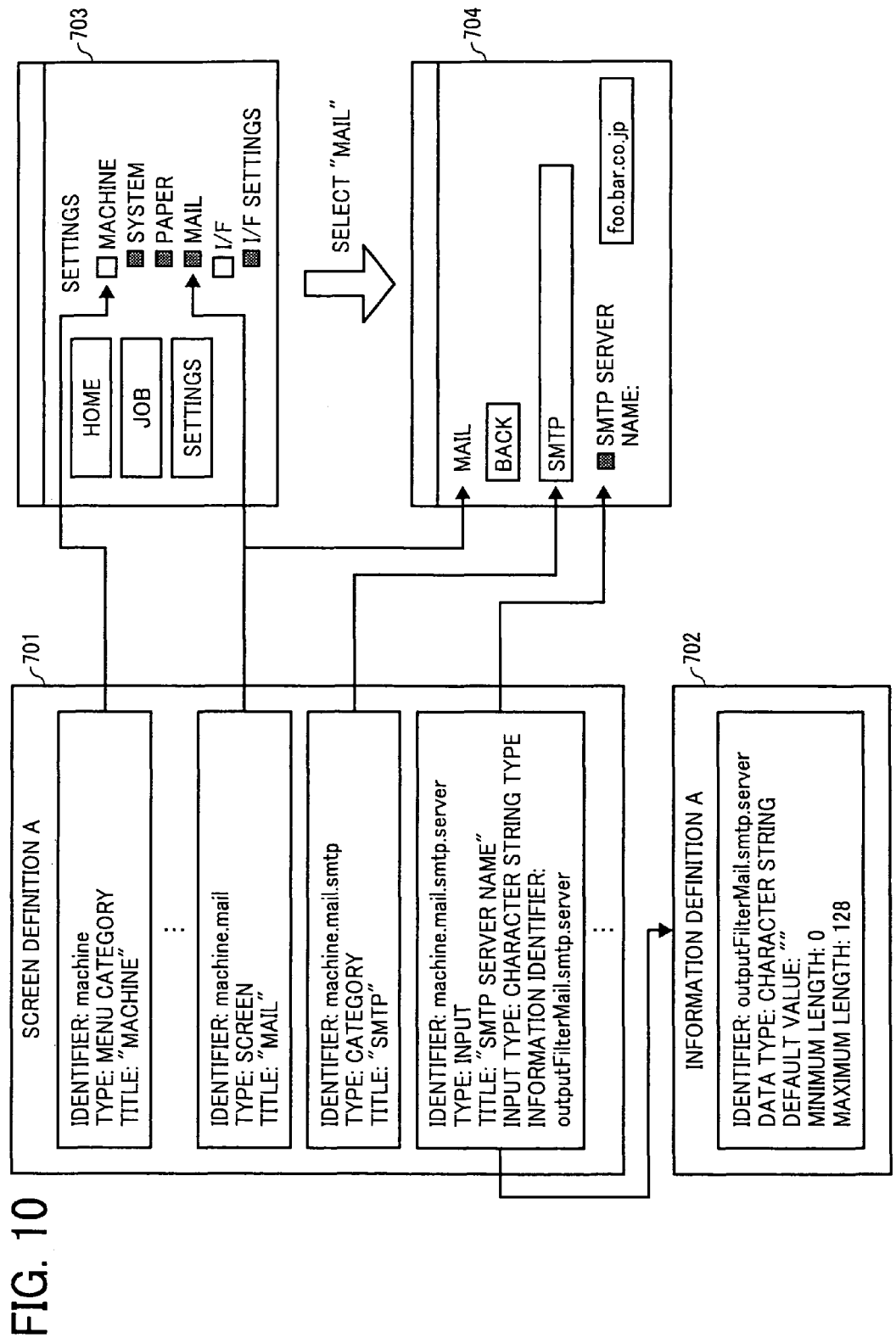
FIG. 10 is a schematic diagram for explaining setting screens that are created from screen definition data-A and information definition data-A stored in the setting-definition DB.

The setting screen data that is created based on the screen definition (i.e., at least one screen specification) stored in the setting-definition DB 133 is described below. FIG. 10 is a schematic diagram for explaining setting screens 703 and 704 that are created from screen definition data-A 701 and information definition data-A 702 stored in the setting-definition DB 133. The display-item selecting unit 123 selects items on upper two layers of the screen definition data-A 701, i.e., the item "machine" and the item "mail" as items to be displayed on the setting screen 703. The display-item selecting unit 123 selects items on a third layer and a fourth layer from the top, i.e., the item "SMTP" and the item "SMTP server name" as items to be displayed on the setting screen 704. The setting screen 704 is displayed when the item "mail" on the setting screen 703 is selected. After that, the screen creating unit 135 creates data about the setting screen 703 and data about the setting screen 704 from the selected items.

A case where screen definition data and information definition data are additionally installed in the setting-definition DB 133 in which the screen definition data-A 701 and the information definition data-A 702 are present is described below.

Figures 11, 11B:
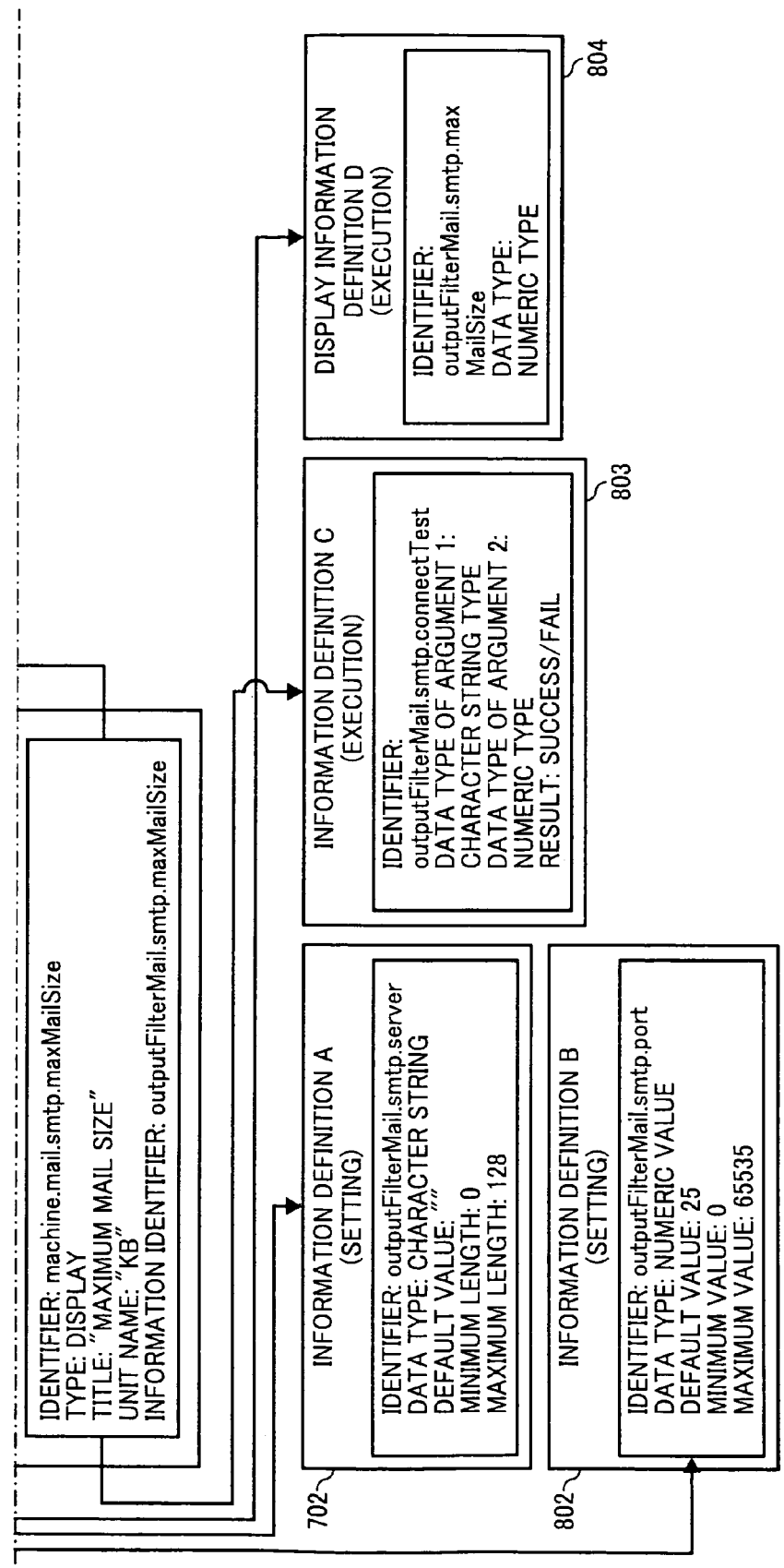
FIG. 11 is a schematic diagram for explaining setting screens that are created from the screen definition data-A, the information definition data-A, screen definition data-B, information definition data-B, information definition data-C, and information definition data-D stored in the setting-definition DB.

FIG. 11 is a schematic diagram for explaining the setting screen 703 and a setting screen 805 that are created from the screen definition data-A 701 and the information definition data-A 702 and the additionally installed data including screen definition data-B 801, information definition data-B 802, information definition data-C 803, and information definition data-D 804, all of them stored in the setting-definition DB 133.

In the example shown in FIG. 11, the screen definition data-B 801 includes "SMTP server port number", "SMTP server connect test", and "maximum mail size" as the fourth layer items. All of those identifiers have the same portion "machine.mail.smtp", i.e., those items are the same in from the first layer to the third layer.

Figure 12:
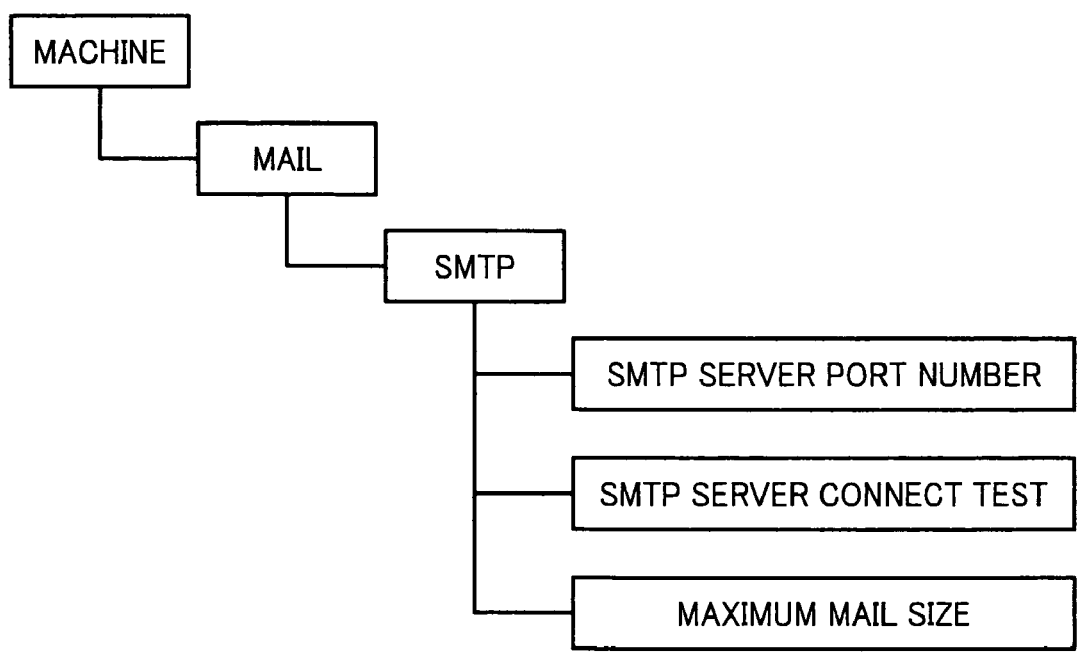
FIG. 12 is a block diagram for explaining the hierarchical structure of setting items stored in the screen definition data-B.

More particularly, the screen specifications defined by the screen definition data-B 801 are arranged hierarchically as shown in FIG. 12. The display-item selecting unit 123 selects the items defined by the screen specifications of the screen definition data-B 801 as items to be displayed on the setting screen 805. The setting screen 805 is displayed when the item "mail" on the setting screen 703 is selected. After that, the screen creating unit 135 creates data about the setting screen 805 from the selected items.

The newly-added items to be displayed on the setting screen 805 are associated with the information specifications in the information definition data-B 802, the information definition data-C 803, and the information definition data-D 804, which makes those items operable. For example, an argument is stored in the information specification of the information definition data-C 803. The component cannot perform a certain process without receiving the argument from the information definition data-C 803.

In the image processing apparatus 100, an object as an entity of the data specification class 640 as shown in FIG. 6 stores therein the default value. The screen creating unit 135 creates, by referring to the object, the screen data that is set to the default value on the item-to-item basis. Setting of the default value can save inputs by the user.

The display unit 137 displays the screen data that is created by the screen creating unit 135 on a liquid crystal panel of the control panel 20.

Figure 13:
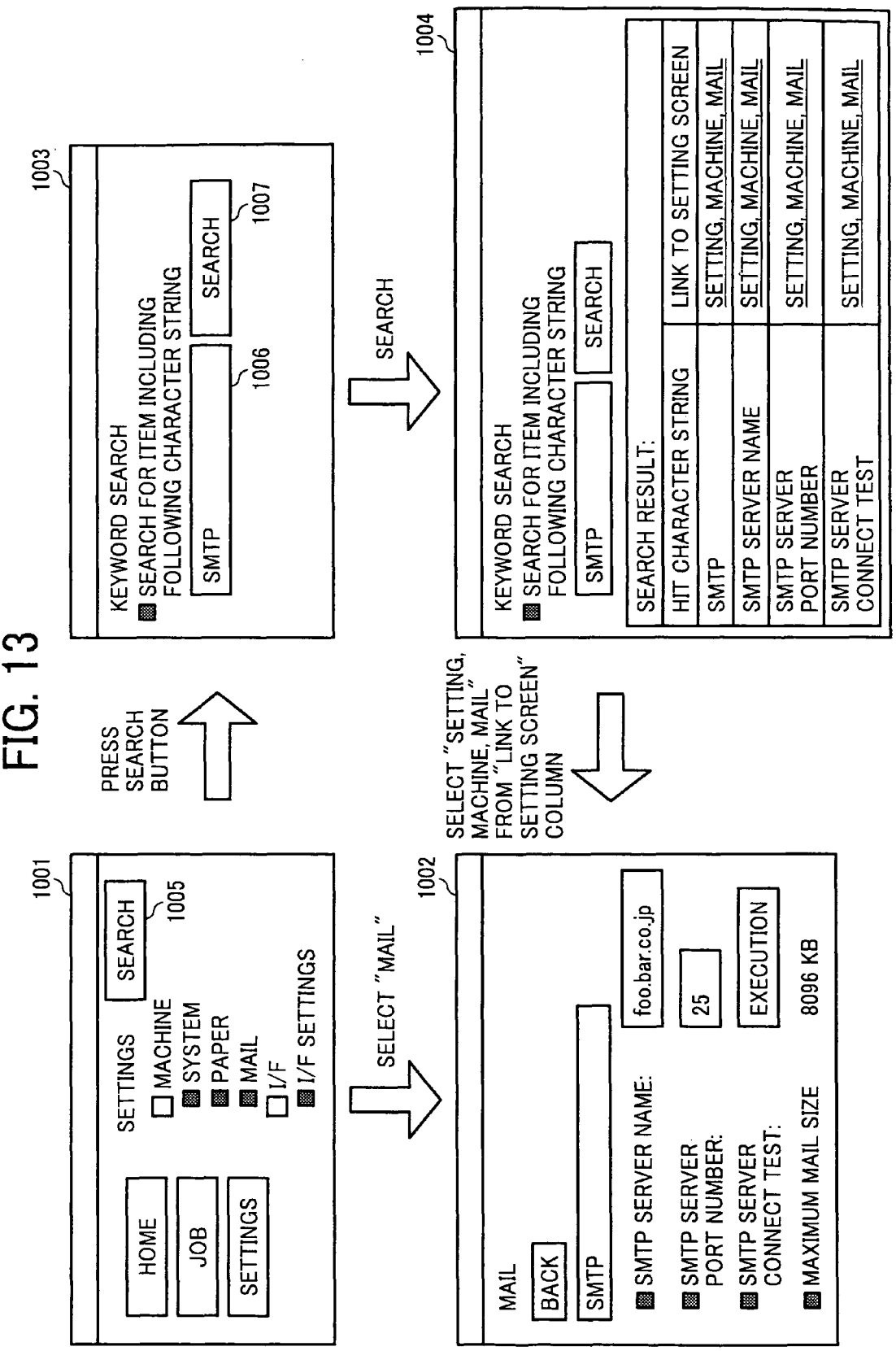
FIG. 13 is a schematic diagram for explaining an order of screens to be displayed before and after a search screen.

A search screen, which is displayed for search, is described below. FIG. 13 is a schematic diagram for explaining an order of screens to be displayed before and after a search screen 1003. As shown in FIG. 13, the display unit 137 displays one of screens 1001 to 1004 in response to selection of the item or the button by the user. If, for example, the user presses a search button 1005 on the screen 1001, the display unit 137 displays the search screen 1003. The user fills in an entry field 1006 with a keyword, and then presses a search button 1007. The search unit 122 searches for an item with the keyword.

If the user fills in the entry field 1006 with, for example, a character string "SMTP", the search unit 122 searches objects as entities of the screen specification class 670 having "SMTP" in the display name 670a.

The screen creating unit 135 creates the search result screen 1004 including a list of items including "SMTP" from a search result received from the search unit 122. After that, the display unit 137 displays the search result screen 1004. When the user selects an item from the item list, the display unit 137 displays the setting screen 1002 including the selected item.

Figure 14:
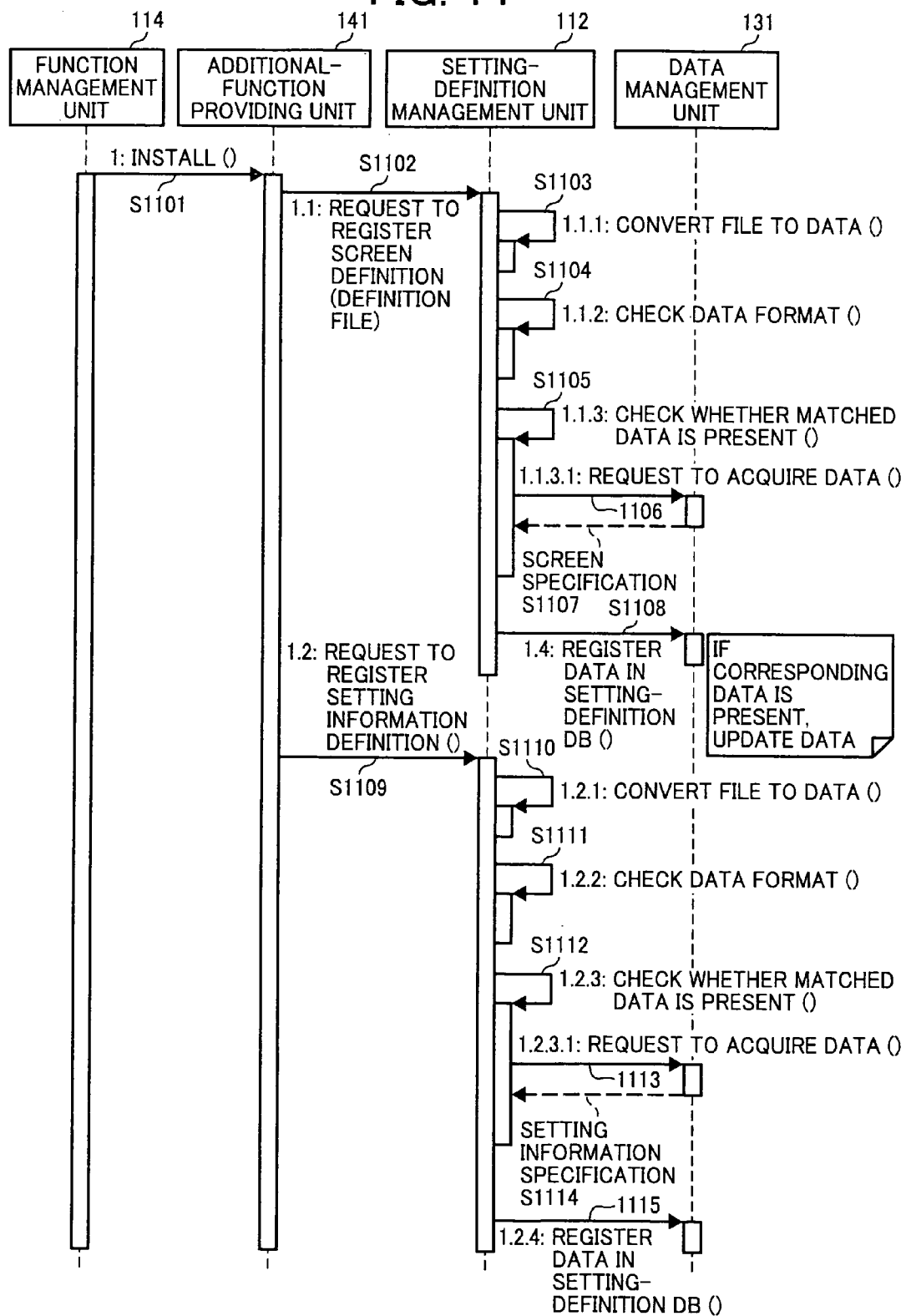
FIG. 14 is a sequence diagram of a process in which the image processing apparatus installs therein an additional-function providing unit.

FIG. 14 is a sequence diagram of a process in which the image processing apparatus 100 installs therein the additional-function providing unit 141.

The function management unit 114 installs the additional-function providing unit 141 that is received from the infrastructure server 200 in the application layer 104 (Step S1101).

The additional-function providing unit 141, after installed, requests the setting-definition management unit 112 to register the screen definition data that is included in the component of itself (Step S1102).

In response to the request, the converting unit 117 converts the XML-based screen definition data into the data having the structure acceptable to the setting-definition DB 133 (Step S1103).

The format check unit 118 checks whether the converted screen specification data, which includes a plurality of screen specifications, satisfies the predetermined format, i.e., the converted screen data is acceptable to the setting-definition DB 133 (Step S1104). If the format check unit 118 determines that the converted screen specification data does not satisfy the predetermined format, the process control goes to end.

When the format check unit 118 determines that the converted screen specification data satisfies the predetermined format, the registering unit 119 checks whether a screen specification matched with one of the converted screen specifications is present in the data management unit 131 (Step S1105). The registering unit 119 requests the data management unit 131 to acquire the matched screen specification (Step S1106).

In response to the request, the data management unit 131 acquires the matched screen specification from the setting-definition DB 133, and sends the acquired screen specification to the setting-definition management unit 112 (Step S1107). If no matched screen specification is found, the data management unit 131 does not perform the sending.

The registering unit 119 of the setting-definition management unit 112 instructs the data management unit 131 to register the converted screen specifications in the setting-definition DB 133 (Step S1108). If the matched screen specification is present in the setting-definition DB 133, the registering unit 119 instructs the data management unit 131 to update the matched screen specification with the corresponding one of the converted screen specifications.

After the screen specifications are registered, the additional-function providing unit 141 requests the setting-definition management unit 112 to register the information definition data that is included in the component of itself (Step S1109).

In response to the request, the converting unit 117 converts the XML-based information definition data into the data having the structure acceptable to the setting-definition DB 133 (Step S1110).

The format check unit 118 checks whether the converted information specification data, which includes a plurality of information specifications, satisfies the predetermined format, i.e., the converted information data is acceptable to the setting-definition DB 133 (Step S1111). If the format check unit 118 determines that the converted information specification data does not satisfy the predetermined format, the process control goes to end.

When the format check unit 118 determines that the converted information specification data satisfies the predetermined format, the registering unit 119 checks whether an information specification matched with one of the converted information specifications is present in the data management unit 131 (Step S1112). The registering unit 119 requests the data management unit 131 to acquire the matched information specification (Step S1113).

In response to the request, the data management unit 131 acquires the matched information specification from the setting-definition DB 133, and sends the acquired information specification to the setting-definition management unit 112 (Step S1114). If no matched information specification is found, the data management unit 131 does not perform the sending.

The registering unit 119 of the setting-definition management unit 112 instructs the data management unit 131 to register the converted information specifications in the setting-definition DB 133 (Step S1115). If the matched information specification is present in the setting-definition DB 133, the registering unit 119 instructs the data management unit 131 to update the matched information specification with the corresponding one of the converted information specifications.

In this manner, the screen specification data and the information specification data corresponding to the newly installed component (e.g., the additional-function providing unit 141) are registered in the setting-definition DB 133.

Therefore, an item related to the newly installed component can be displayed on a target setting screen.

Figure 15:
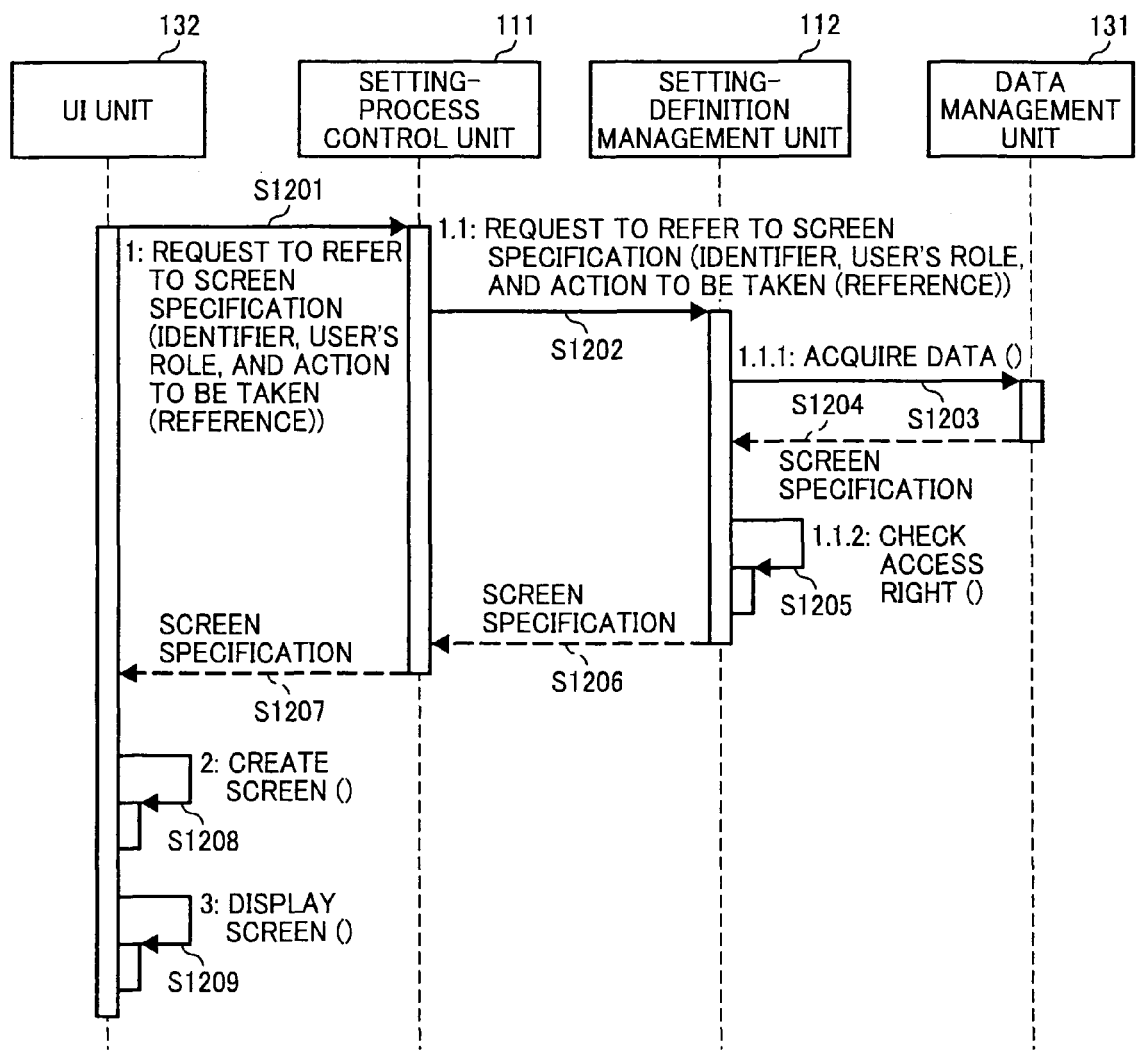
FIG. 15 is a sequence diagram of a process in which the image processing apparatus displays the setting screen.

FIG. 15 is a sequence diagram of a process in which the image processing apparatus 100 displays the setting screen.

When the instruction receiving unit 134 receives a certain instruction from the user by means of, for example, pressing of a button, the UI unit 132 requests the setting-process control unit 111 to refer to the screen specification (Step S1201). More particularly, the UI unit 132 sends the identifier corresponding to the selected or pressed item, the role of the login user, and the action to be taken as arguments. In the example shown in FIG. 15, because the user wishes to display the setting screen, the action to be taken is "reference".

The setting-process control unit 111 requests the setting-definition management unit 112 to refer to the screen specification (Step S1202). More particularly, the setting-process control unit 111 sends the identifier corresponding to the selected or pressed item, the role of the login user, and the action to be taken as arguments.

In response to the request, the display-item selecting unit 123, which is included in the data control unit 120 of the setting-definition management unit 112, selects an item to be included in the setting screen to be displayed by the identifier that is received as the argument. The data control unit 120 instructs the data management unit 131 to acquire the screen specification data corresponding to the identifier of the selected item (Step S1203).

In response to the instruction, the data management unit 131 sends the screen specification data corresponding to the selected item to the setting-definition management unit 112 (Step S1204).

The access check unit 121 of the setting-definition management unit 112 checks whether the user is authorized for reference by comparing the role of the login user to the role-based authority extracted from the received screen specification data (Step S1205). If the user is not authorized for reference, the process control goes to end.

If the user is authorized for reference, the setting-definition management unit 112 sends the screen specification data to the setting-process control unit 111 (Step S1206).

Upon receiving the screen specification data, the setting-process control unit 111 sends the received screen specification data to the UI unit 132 (Step S1207).

The screen creating unit 135 of the UI unit 132 creates the setting screen data from the received screen specification data (Step S1208).

The display unit 137 then displays the created setting screen data (Step S1209).

Thus, the image processing apparatus 100 displays the setting screen corresponding to the item selected by the user.

Figure 16:
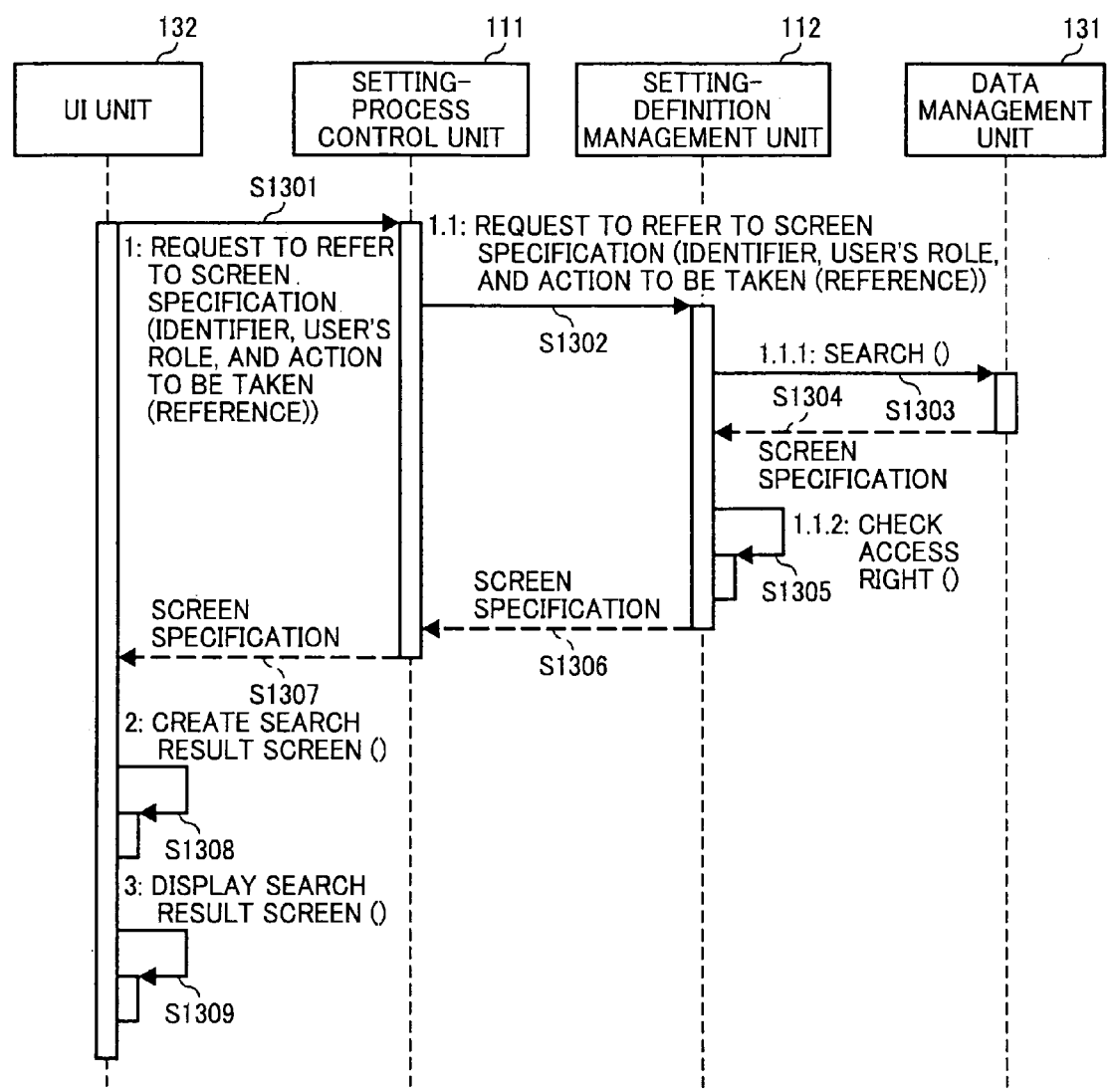
FIG. 16 is a sequence diagram of a process in which the image processing apparatus displays a search result screen.

FIG. 16 is a sequence diagram of a process in which the image processing apparatus 100 displays the search result screen.

When the instruction receiving unit 134 receives a certain instruction from the user by means of, for example, pressing of a button, the UI unit 132 requests the setting-process control unit 111 to search for the screen specification (Step S1301). More particularly, the UI unit 132 sends the identifier, the role of the login user, and the action to be taken as arguments. In the example shown in FIG. 16, because the user wishes to display the search result screen, the action to be taken is "reference".

The setting-process control unit 111 requests the setting-definition management unit 112 to search for the screen specification (Step S1302). More particularly, the setting-process control unit 111 sends the identifier, the role of the login user, and the action to be taken as arguments.

In response to the request, the search unit 122, which is included in the data control unit 120 of the setting-definition management unit 112, instructs the data management unit 131 to search for an item satisfying the search condition that is received as an argument (Step S1303). In response to the instruction, the data management unit 131 acquires the screen specification satisfying the search condition from the setting-definition DB 133.

The data management unit 131 then sends the acquired screen specification data to the setting-definition management unit 112 (Step S1304).

The access check unit 121 of the setting-definition management unit 112 checks whether the user is authorized for reference by comparing the role of the login user to the role-based authority extracted from the received screen specification data (Step S1305). If the user is not authorized for reference, the process control goes to end.

If the user is authorized for reference, the setting-definition management unit 112 sends the screen specification data to the setting-process control unit 111 (Step S1306).

Upon receiving the screen specification data, the setting-process control unit 111 sends the received screen specification data to the UI unit 132 (Step S1307).

The screen creating unit 135 of the UI unit 132 creates the search-result-screen data from the received screen specification data (Step S1308).

The display unit 137 then displays the created search-result-screen data (Step S1309).

Figure 17:
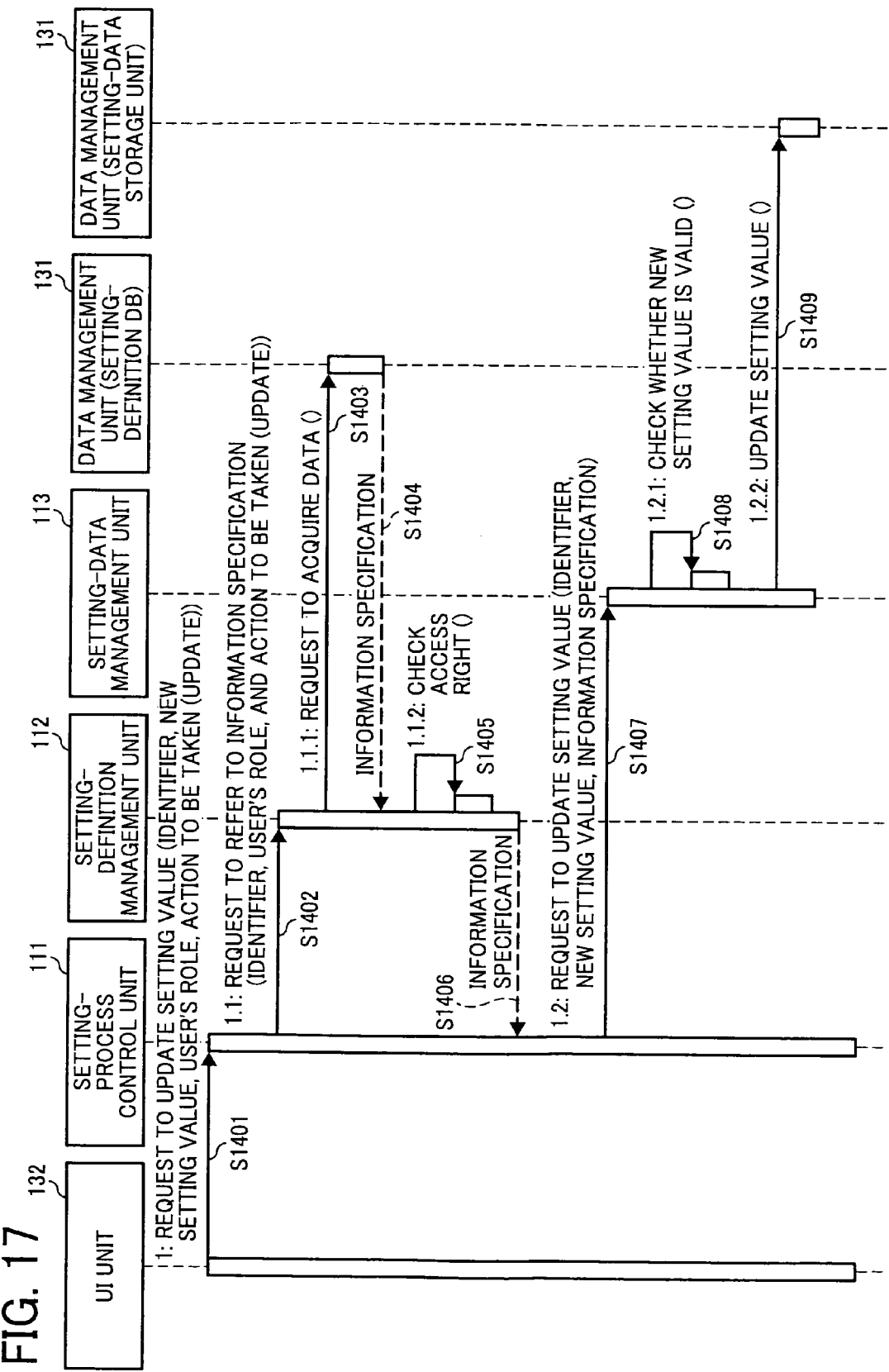
FIG. 17 is a sequence diagram of a process that occurs when the user inputs a setting value of the item appearing on the setting screen of the image processing apparatus.

FIG. 17 is a sequence diagram of a process that occurs when the user inputs a setting value of the item appearing on the setting screen of the image processing apparatus 100.

The UI unit 132 requests the setting-process control unit 111 to update the target item with the received setting value (Step S1401). More particularly, the UI unit 132 sends the identifier corresponding to the target item, the new setting value, the role of the login user, and the action to be taken as arguments. In the example shown in FIG. 17, the action to be taken is "update".

The setting-process control unit 111 requests the setting-definition management unit 112 to refer to the information specification (Step S1402). More particularly, the setting-process control unit 111 sends the identifier corresponding to the target item, the role of the login user, and the action to be taken as arguments.

In response to the reference request, the data control unit 120 of the setting-definition management unit 112 instructs the data management unit 131 to acquire the information specification data corresponding to the received identifier (Step S1403).

In response to the instruction, the data management unit 131 sends the information specification data corresponding to the target item to the setting-definition management unit 112 (Step S1404).

The access check unit 121 of the setting-definition management unit 112 checks whether the user is authorized a for update by comparing the role of the login user to the role-based authority extracted from the received information specification data (Step S1405). If the user is not authorized for update, the process control goes to end.

If the user is authorized for update, the setting-definition management unit 112 sends the information specification data to the setting-process control unit 111 (Step S1406).

After that, the setting-process control unit 111 requests the setting-data management unit 113 to update the target item with the new setting value (Step S1407). More particularly, the setting-process control unit 111 sends the identifier corresponding to the target item, the received new setting value, and the received information specification data as arguments.

The setting-value check unit 115 of the setting-data management unit 113 checks based on the received information specification data whether the setting value is valid (Step S1408). More particularly the setting-value check unit 115 checks whether the new setting value is in the range from the maximum value to the minimum value by referring to the received information specification data. If the setting value is not a numeric value but a character string, the setting-value check unit 115 checks whether the new setting value is in the range from the maximum length to the minimum length.

The setting-data management unit 113 instructs the data management unit 131 to update the setting value of the target item corresponding to the received identifier to the received setting value (Step S1409).

Thus, the target item is updated to the new setting value, if the new setting value is in the range defined by the information specification data. With this process, it is possible to prevent the component of the image processing apparatus 100 from performing the process with invalid settings.

Figure 18:
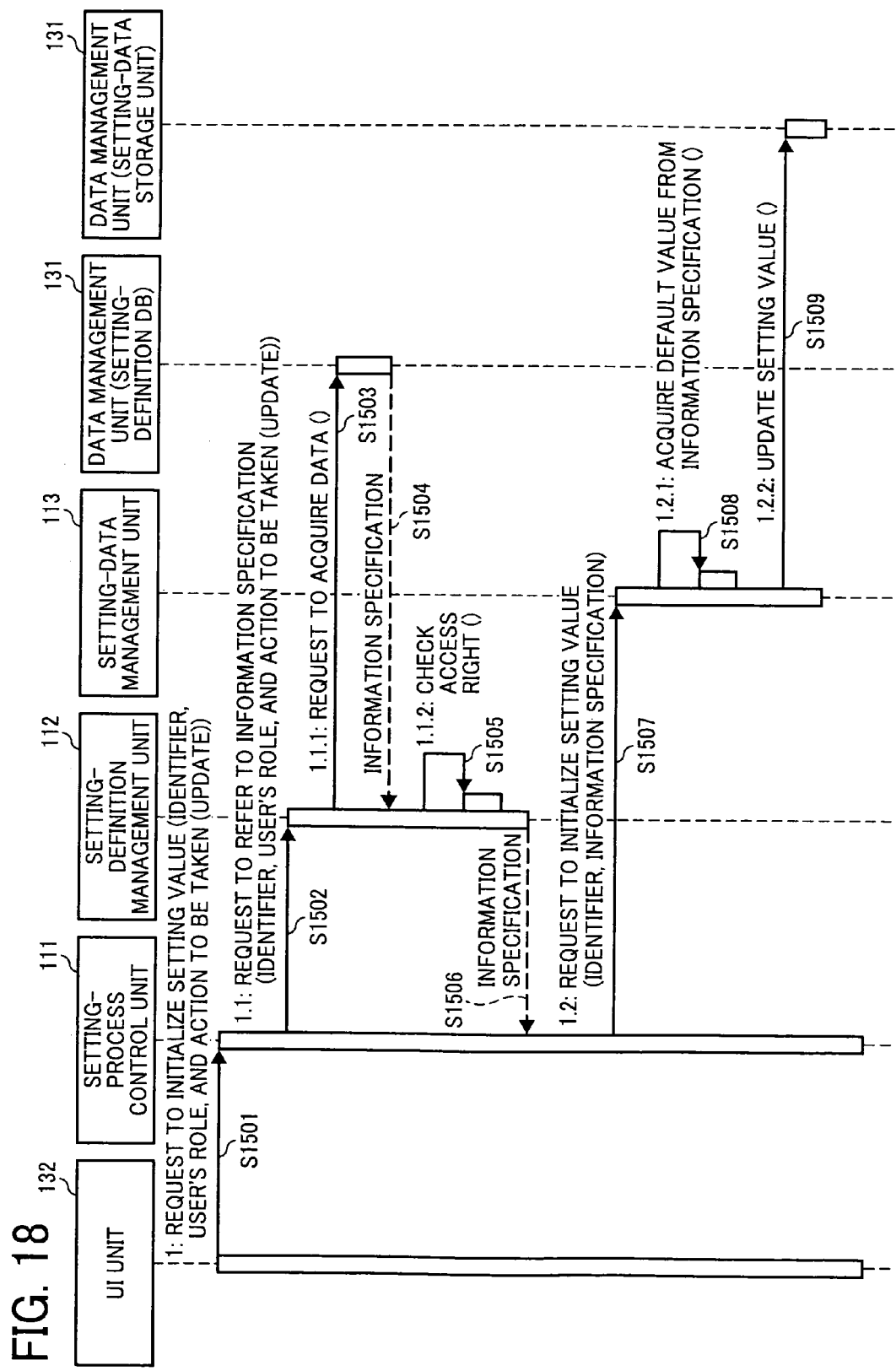
FIG. 18 is a sequence diagram of a process of initializing the setting value of the item appearing on the setting screen of the image processing apparatus.

FIG. 18 is a sequence diagram of a process of initializing the setting value of the item appearing on the setting screen of the image processing apparatus 100.

The UI unit 132 requests the setting-process control unit 111 to initialize the setting value of the target item (Step S1501). More particularly, the UI unit 132 sends the identifier corresponding to the target item, the role of the login user, and the action to be taken as arguments. In the example shown in FIG. 18, the action to be taken is "update".

The setting-process control unit 111 requests the setting-definition management unit 112 to refer to the information specification (Step S1502). More particularly, the setting-process control unit 111 sends the identifier corresponding to the target item, the role of the login user, and the action to be taken as arguments.

In response to the reference request, the data control unit 120 of the setting-definition management unit 112 instructs the data management unit 131 to acquire the information specification data corresponding to the received identifier (Step S1503).

In response to the instruction, the data management unit 131 sends the information specification data corresponding to the target item to the setting-definition management unit 112 (Step S1504).

The access check unit 121 of the setting-definition management unit 112 checks whether the user is authorized for update by comparing the role of the login user to the role-based authority extracted from the received information specification data (Step S1505). If the user is not authorized for update, the process control goes to end.

If the user is authorized for update, the setting-definition management unit 112 sends the information specification data to the setting-process control unit 111 (Step S1506).

After that, the setting-process control unit 111 requests the setting-data management unit 113 to initialize the setting value of the target item (Step S1507). More particularly, the setting-process control unit 111 sends the identifier corresponding to the target item and the received information specification data as arguments.

The setting-data management unit 113 acquires the default value from the received information specification data (Step S1508). More particularly, the setting-data management unit 113 acquires the default value from the default value 640a that is an object as an entity of the data specification class 640.

The setting-data management unit 113 instructs the data management unit 131 to update the setting value of the target item corresponding to the received identifier to the acquired default value (Step S1509).

Thus, the setting value of the target item is set to the default value. This makes it possible to reduce a user's workload about settings for the component.

Figure 19:
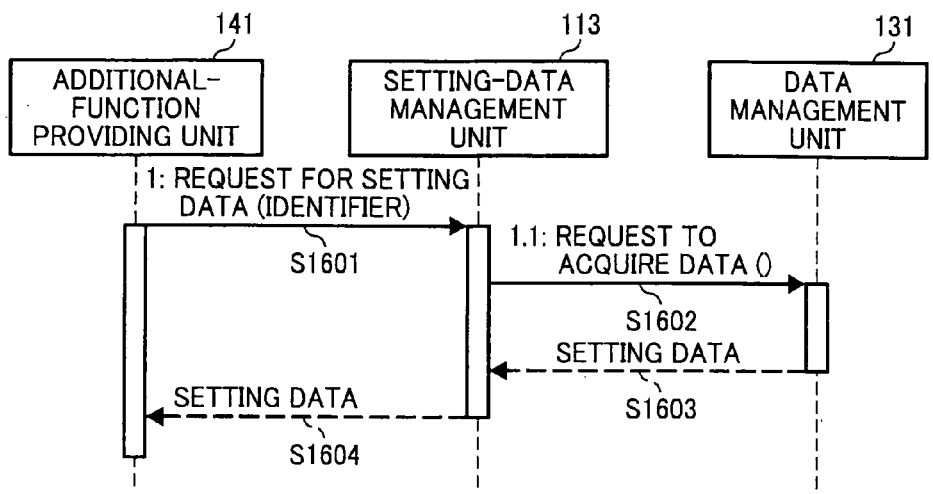
FIG. 19 is a sequence diagram of a process in which the additional-function providing unit acquires setting data.

FIG. 19 is a sequence diagram of a process in which the component (the additional-function providing unit 141) of the image processing apparatus 100 acquires the setting data.

The additional-function providing unit 141 requests the setting-data management unit 113 to refer to the setting data (including the setting value) corresponding to the target item (Step S1601). More particularly, the additional-function providing unit 141 sends the identifier corresponding to the target item as an argument.

The setting-data management unit 113 requests the data management unit 131 to acquire the setting data corresponding to the received identifier (Step S1602).

In response to the request, the data management unit 131 acquires the setting data corresponding to the target item from the data management unit 131, and sends the acquired setting data to the setting-data management unit 113 (Step S1603).

The setting-data management unit 113 sends the received setting data to the additional-function providing unit 141 (Step S1604).

In this manner, the component installed in the application layer 104 can acquire the setting data of the target item by sending the corresponding identifier. With this configuration, the component performs processes by using not only the setting data that is set based on the self component but also the setting data that is set based on another component.

Figure 20:
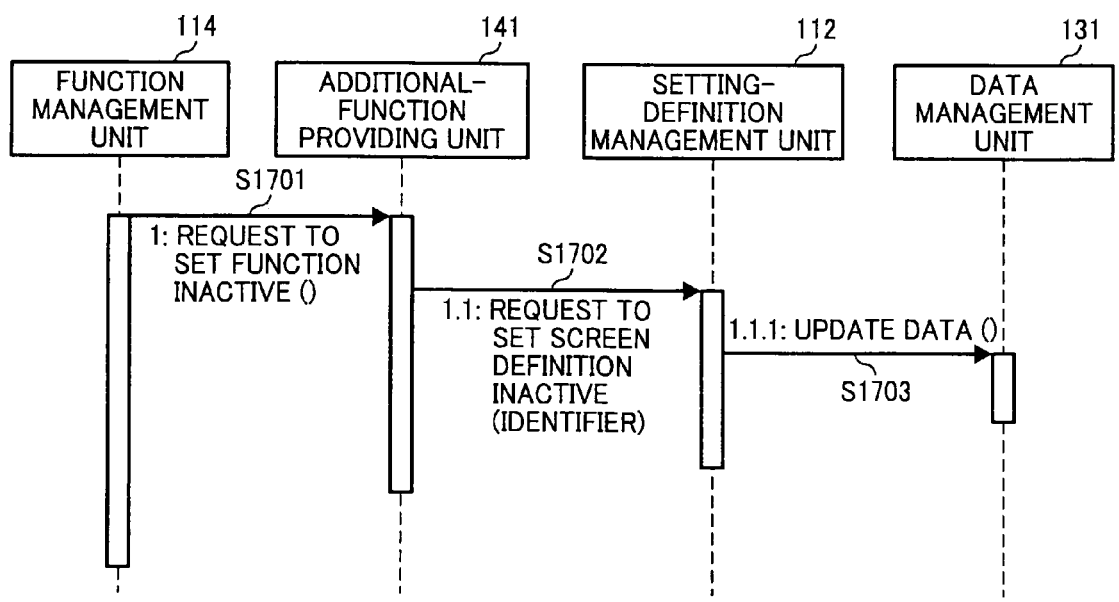
FIG. 20 is a sequence diagram of a process in which the image processing apparatus stops a function of the additional-function providing unit.

FIG. 20 is a sequence diagram of a process in which the image processing apparatus 100 stops the function of the component (the additional-function providing unit 141).

The function management unit 114 requests the additional-function providing unit 141 to set the function inactive (Step S1701).

In response to the request, the additional-function providing unit 141 stops the self function, and requests the setting-definition management unit 112 to set the screen definition inactive (Step S1702). More particularly, the additional-function providing unit 141 sends the identifier corresponding to the screen specification data related to the additional-function providing unit 141 as an argument.

The setting-definition management unit 112 then instructs the data management unit 131 to set OFF the flag of the screen specification data corresponding to the identifier that is received as the argument (Step S1703). In response to the instruction, the data management unit 131 sets OFF the flag that is stored in the setting-definition DB 133.

In this manner, when the function of the additional-function providing unit 141 stops, the item related to the additional-function providing unit 141 automatically disappears from the setting screen. Although the screen specification data is identified by using the identifier in the example shown in FIG. 20, it is allowable to use the component name instead of the identifier.

Figure 21:
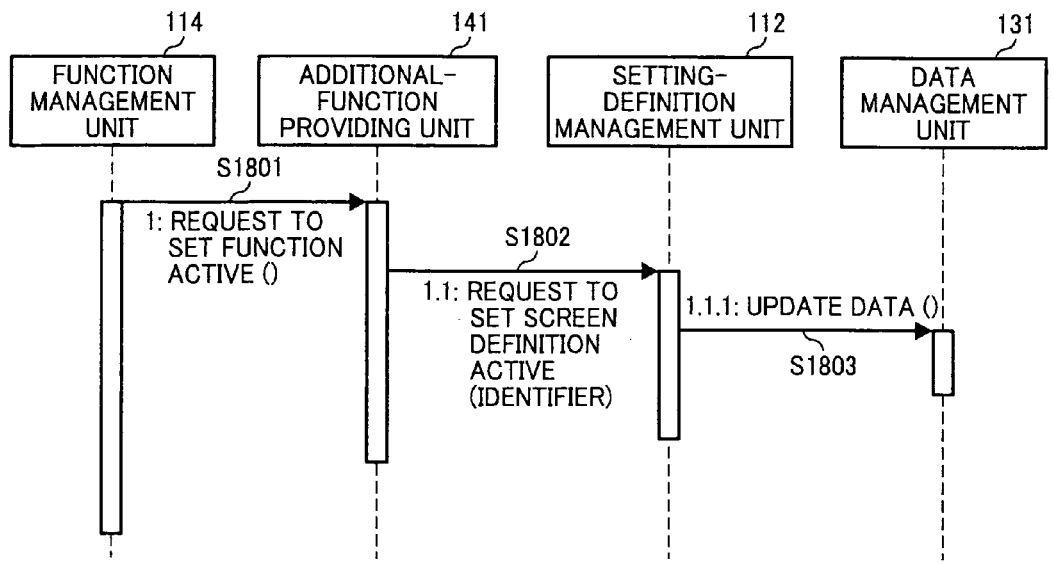
FIG. 21 is a sequence diagram of a process in which the image processing apparatus starts the function of the additional-function providing unit.

FIG. 21 is a sequence diagram of a process in which the image processing apparatus 100 starts the function of the component (the additional-function providing unit 141).

The function management unit 114 requests the additional-function providing unit 141 to set the function active (Step S1801).

In response to the request, the additional-function providing unit 141 performs a process for starting the self function, and requests the setting-definition management unit 112 to set the screen definition data active (Step S1802). More particularly, the additional-function providing unit 141 sends the identifier corresponding to the screen specification data related to the additional-function providing unit 141 as an argument.

The setting-definition management unit 112 instructs the data management unit 131 to set ON the flag of the screen specification data corresponding to the identifier that is received as the argument (Step S1803). In response to the instruction, the data management unit 131 sets ON the flag that is stored in the setting-definition DB 133.

In this manner, when the function of the additional-function providing unit 141 starts, the item related to the additional-function providing unit 141 automatically appears on the setting screen. Although the screen specification data is identified by using the identifier in the example shown in FIG. 21, it is allowable to use the component name instead of the identifier.

Figure 22:
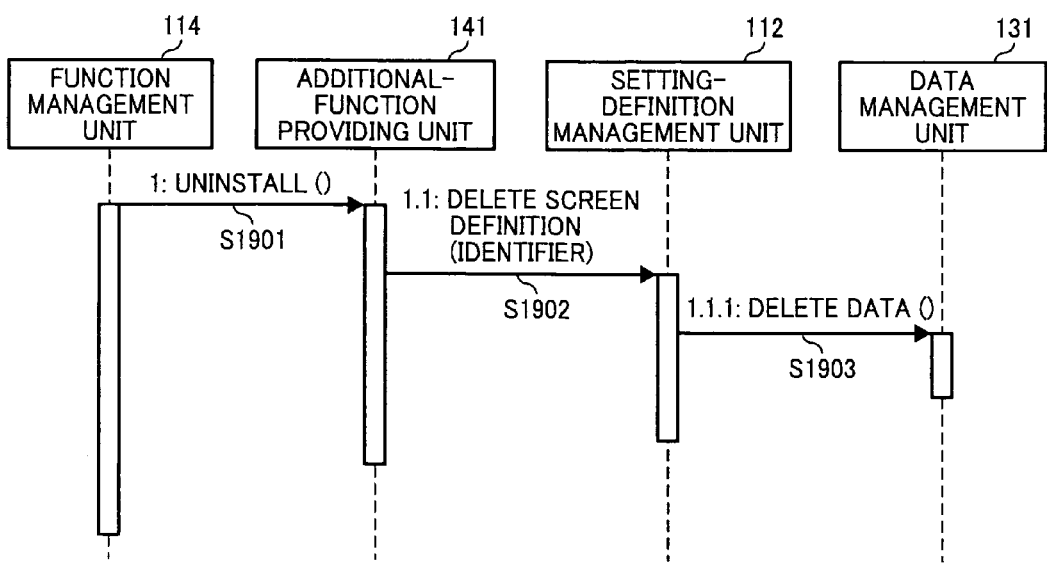
FIG. 22 is a sequence diagram of a process in which the image processing apparatus uninstalls the additional-function providing unit.

FIG. 22 is a sequence diagram of a process in which the image processing apparatus 100 uninstalls the component (the additional-function providing unit 141).

The function management unit 114 instructs the additional-function providing unit 141 to uninstall (Step S1901).

In response to the instruction, the additional-function providing unit 141 starts a process of uninstalling the self component, and requests the setting-definition management unit 112 to delete the screen specification data (Step S1902). More particularly, the additional-function providing unit 141 sends the identifier corresponding to the screen specification data related to the additional-function providing unit 141 as an argument.

The setting-definition management unit 112 instructs the data management unit 131 to delete the screen specification data corresponding to the identifier that is received as the argument (Step S1903). In response to the instruction, the data management unit 131 deletes the screen specification data from the setting-definition DB 133.

In this manner, when the additional-function providing unit 141 is uninstalled, the item related to the additional-function providing unit 141 is automatically deleted from the setting screen.

Because the identifier of each of the screen specification data and the information specification data is described in the hierarchical structure, information assigned to a certain specification (e.g., access right) can be inherited to a specification lower than the certain specification. Therefore, all the information about, for example, access control is managed as a unit. This means that it is unnecessary to independently create access-control rules for an additionally installed function. In the image processing apparatus 100 according to the first embodiment, various components including existing components and additionally installed components share one access control policy.

Moreover, the items of the setting screen and the settings of each item are stored arranged in the class structure shown in FIG. 6. However, this class structure is an example and it is allowable to store the items and the settings arranged in another class structure as long as the item-based hierarchical structure is maintained.

Furthermore, the image processing apparatus 100 installs the XML file that defines the items to be displayed on the setting screen (i.e., screen definition data) along with the component, and thereby displays the items related to the installed component on the setting screen. In this manner, the image processing apparatus 100 can dynamically change the setting screen. In other words, the user's workload of creating the setting screen can be reduced.

Moreover, the image processing apparatus 100 installs the XML file that defines the setting data, i.e., details of each item to be displayed on the setting screen (i.e., information definition data) along with the component, and thereby stores even the setting data, which is not displayed on the setting screen, in the setting-definition DB 133 in the same manner as the screen definition data is stored.

Furthermore, the image processing apparatus 100 installs the screen definition data and the information definition data of each component, and stores the data in the setting-definition DB 133 in such a manner each specification is assigned to the unique identifier 610a and the unique component name 610b. With this configuration, when the component is inactive or uninstalled from the image processing apparatus 100, the data control unit 120 identifies the specifications (including the screen specifications and the information specifications) related to the inactive or uninstalled component by the component name 610b or the identifier 610a, and sets OFF the flag 610c of the identified specifications. Eventually, the screen creating unit 135 creates the setting screen without using the inactive specifications. As a result, the items related to the inactive or uninstalled component are not displayed on the setting screen of the control panel 20. In this manner, the display/hide state of the item corresponding to the component is switched in conjunction with switching of the active/inactive state of the component.

In the conventional image processing apparatus, the information about the setting screen is stored in firmware. Therefore, to update the setting screen along with the component, the entire firmware has to be updated. The image processing apparatus 100 according to the first embodiment, in contrast, manages the information about the setting screen with the setting-definition DB 133. Therefore, if it is necessary to update the item of the setting screen along with update of the component or the like, the image processing apparatus 100 updates only the screen specifications and the information specifications related to the component stored in the setting-definition DB 133. As a result, the user's workload of updating the item can be reduced.

In the first embodiment, the authority is associated with each of the information specifications and the screen specifications, and the authorities are editable independently. However, the authority can be associated in some other manners. In a second embodiment of the present invention, the authority is associated with only the menu items on a predetermined layer in the setting screen.

If the authority is set on the item-to-item basis in the same manner as the first embodiment, complicated operation may be required to change the authority. Moreover, if the authority is set on the item-to-item basis, a total amount of data about the authority will be large remarkably. To solve the problems, in the second embodiment, the authority is associated with only the menu item on a predetermined layer. Each item included in a certain menu item refers to the authority associated with the certain menu item.

Figure 23:
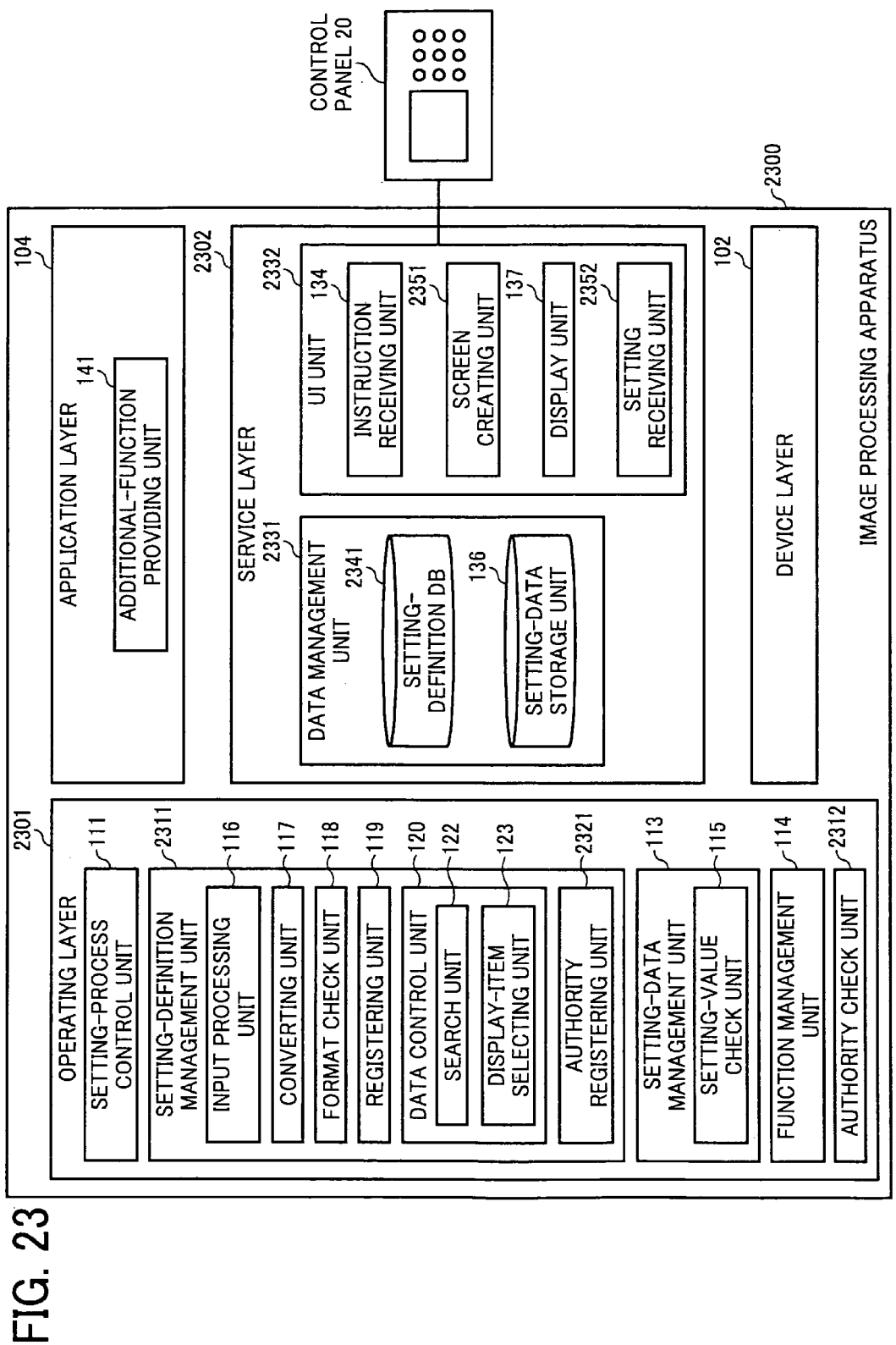
FIG. 23 is a block diagram of an image processing apparatus according to a second embodiment of the present invention.

FIG. 23 is a block diagram of an image processing apparatus 2300 according to the second embodiment. The configuration of the image processing apparatus 2300 is almost the same as the configuration of the image processing apparatus 100 according to the first embodiment except that an operating layer 2301 and a service layer 2302 are used instead of the operating layer 101 and the service layer 103, respectively. Parts corresponding to those in the first embodiment are denoted with the same reference numerals, and the same description is not repeated.

Figure 24:
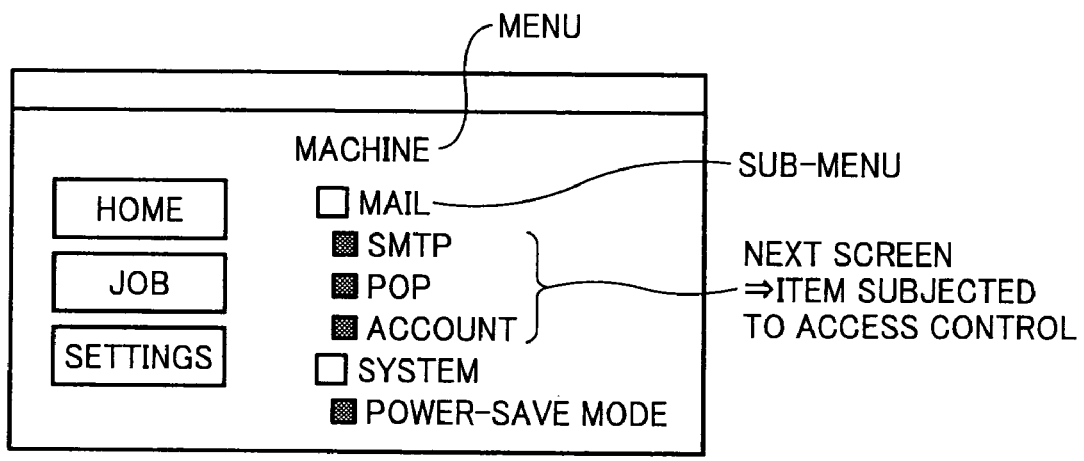
FIG. 24 is a schematic diagram of a setting screen appearing on the image processing apparatus shown in FIG. 23.

The menu item with which the authority is associated is described below. FIG. 24 is a schematic diagram of a setting screen appearing on the image processing apparatus 2300. A menu "MACHINE", a sub-menu "MAIL", and menu items "SMTP", "POP", and "ACCOUNT" are shown in the example of FIG. 24, arranged in the hierarchical structure. When one of the menu items is pressed, a corresponding next screen appears. In the second embodiment, the menu is categorized to a first group, the sub-menu is categorized to a second group, and the menu items are categorized to a third group. The access right is associated with each of the menu items that are categorized to the third group. Items that are on layers lower than the layer on the menu items refer to the authority of the menu items. The configuration of the image processing apparatus 2300 is described below.

The service layer 2302 includes a data management unit 2331 and a UI unit 2332. The data management unit 2331 works differently than the data management unit 131 according to the first embodiment works, and the UI unit 2332 works differently than the UI unit 132 works.

The data management unit 2331 includes a setting-definition DB 2341 instead of the setting-definition DB 133.

Figure 25:
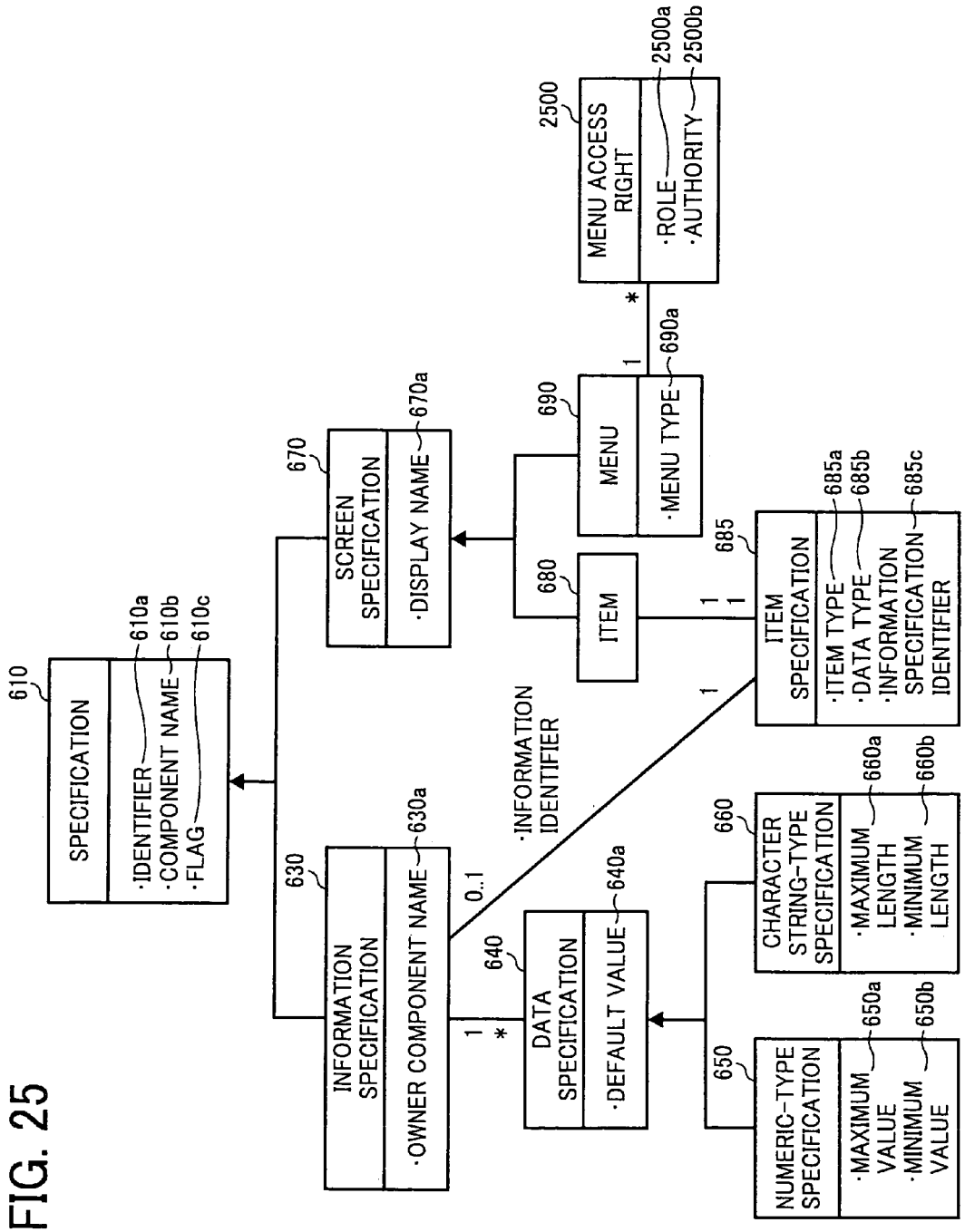
FIG. 25 is a block diagram for explaining class structure of the setting-definition DB shown in FIG. 23.

The setting-definition DB 2341 stores therein all the screen specification data extracted from the screen definition data and the information specification data extracted from the information definition data. The class structure of the setting-definition DB 2341 is different from the class structure of the setting-definition DB 133. FIG. 25 is a block diagram for explaining the class structure of the setting-definition DB 2341. The access-right class 620, which is shown in the class structure of the setting-definition DB 133 associated with the specification class 610, is deleted from the class structure shown in FIG. 25; and a menu access-right class 2500 is added to the class structure. The menu access-right class 2500 is associated with the menu class 690. In other words, the menu access-right class 2500 is in charge of managing the menu access right defined by the menu class 690.

In the setting-definition DB 2341, the menu class 690, which is an inheritance of the screen specification class 670, is associated with the menu access-right class 2500.

The menu access-right class 2500 includes a role 2500*a* and an authority 2500*b* as attributes. The role 2500*a* and the authority 2500*b* are counterparts of the role 620*a* and the authority 620*b* of the access-right class 620 in the first embodiment, and therefore the same description is not repeated.

An object as an entity of the menu access-right class 2500 is associated with, from among menu objects as entities of the menu class 690, only a menu object having the menu type 690*a* indicating "third group".

In other words, the menu items, which cause the next screen to appear, are associated with the access right. The menu items to be associated with the access right can be either the existing items that are present in the setting-definition DB 2341 or the new items that are additionally registered by the registering unit 119 in the setting-definition DB 2341.

Figure 26:
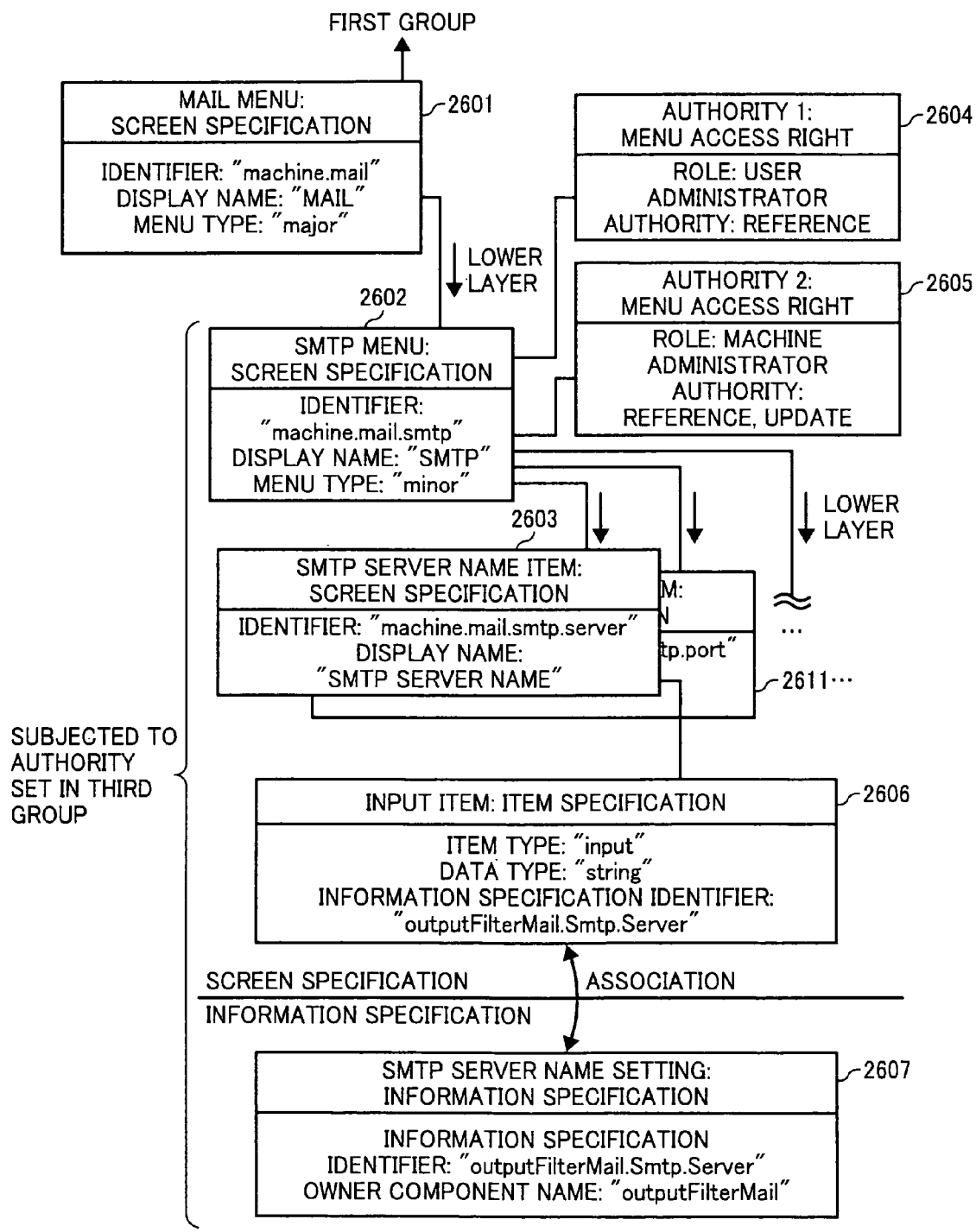
FIG. 26 is a block diagram for explaining a concept of object data included in the screen specifications and the item specifications when objects are created as entities based on the class structure shown in FIG. 25.

FIG. 26 is a block diagram for explaining a concept of object data included in the screen specifications and the item specifications when objects are created as entities based on the class structure shown in FIG. 25. Objects 2601, 2602, and 2603, each of which is a screen specification object, are arranged in the hierarchical structure according to the identifiers. The objects 2601 and 2602 are, more particularly, menu objects. The object 2601 includes the menu type "major", and the object 2602 includes the menu type "minor". The menu type "major" indicates that the object is categorized to the second group. The menu type "minor" indicates that the object is categorized to the third group.

The object 2602 as an SMTP menu object including the menu type "minor" is associated with objects 2604 and 2605 as the menu access-right objects. The authorities defined by the objects 2604 and 2605 are effective in not only the object 2602 but also objects lower than the object 2602, such as item objects 2606 and 2611, an item specification object 2606, and an information specification object 2607.

To acquire all the objects 2601 to 2607 shown in FIG. 26, it is required to issue three requests to refer to the screen specifications (the first request is for the object 2601, the second request for the objects 2602, 2604, and 2605, and the third request is for the objects 2603 and 2604) and one request to refer to the information specification (the object 2607).

The UI unit 2332 includes a screen creating unit 2351, instead of the screen creating unit 135, and a setting receiving unit 2352.

The screen creating unit 2351 creates the screen data to be displayed on the control panel 20 in the almost same manner as the screen creating unit 135 according to the first embodiment. In contrast to the screen creating unit 135, the screen creating unit 2351 creates the screen data in such a manner that a display form the menu objects and the item objects appearing on the setting screen differs according to the authority associated with the menu item. The display form is variable only for the menu objects including the menu type "minor" or the lower-layered menu objects and the item objects. The screen creating unit 2351 properly decides the display form of those objects by referring to the authority associated with the menu object including the menu type "minor". Moreover, the screen creating unit 2351 properly decides which item is to be displayed.

The screen creating unit 2351 creates the setting screen in which only the items to be displayed appear in the proper display form based on a result of authority check preformed by a later-described authority check unit 2312 of the operating layer 2301. The setting screens that are created based on the screen specification objects and the item specification objects shown in FIG. 25 are described below.

FIG. 27 is a schematic diagram of an exemplary setting screen for a machine administrator that is created by the screen creating unit 2351. Because the machine administrator is authorized to refer to the SMTP menu and update the SMTP menu, the items are displayed in an editable form. Therefore, the machine administrator can update the setting values of the items.

FIG. 28 is a schematic diagram of an exemplary setting screen for a user administrator that is created by the screen creating unit 2351. Because the machine administrator is authorized only to refer to the SMTP menu, the setting values of the items are displayed in a non-editable form. Therefore, the user administrator can only refer to the setting values of the items.

The screen creating unit 2351 creates a setting screen for changing the authority on the item-to-item basis in response to a request from the user. More particularly, the screen creating unit 2351 creates the setting screen by acquiring the menu objects including the menu type "minor" from the setting-definition DB 2341. The screen creating unit 2351 reflects the authority that is defined by the menu access-right object associated with each of the menu objects including the menu type "minor" in the setting screen.

FIG. 29 is a schematic diagram of an exemplary setting screen that is created by the screen creating unit 2351 for changing the authority of each item. As shown in the example shown in FIG. 29, the screen creating unit 2351 creates the setting screen in such a manner that the user can set the authority of each menu item having the menu type "minor" on the user's role basis. The setting screen for changing the authority is preferably displayed only for a user having a particular role such as the machine administrator.

The setting receiving unit 2352 shown in FIG. 23 receives settings about the item-based access right from the user via the setting screen shown in FIG. 29. The setting receiving unit 2352 receives at least one of reference, update, and execution as a new access right. The new access right received by the setting receiving unit 2352 is reflected in the setting-definition DB 2341 by a later-described authority registering unit 2321 of the operating layer 2301.

The operating layer 2301 includes the authority check unit 2312 and a setting-definition management unit 2311 instead of the setting-definition management unit 112.

The setting-definition management unit 2311 includes the authority registering unit 2321 instead of the access check unit 121.

The authority registering unit 2321 registers/updates the item-based access right that is received by the setting receiving unit 2352 in the setting-definition DB 2341.

Before the screen creating unit 2351 creates the setting screen, the authority check unit 2312 checks whether the user is authorized to access to the item to be displayed. More particularly, the authority check unit 2312 checks whether the user is authorized for reference, update, or execution by referring to the authority associated with the user's role (e.g., user administrator) of the menu access-right object.

The authority check unit 2312 does not perform the authority check about the items having the menu type "category" or "major", while performs the authority check about the items having the menu type "minor" and the items lower than the items having the menu type "minor".

If it is determined that the item is to be subjected to the authority check, the authority check unit 2312 checks whether the user is authorized to access to the item to be displayed by referring to the item on the upper layer (having the menu type "minor") and the corresponding access right stored in the setting-definition DB 2341.

Figure 30:
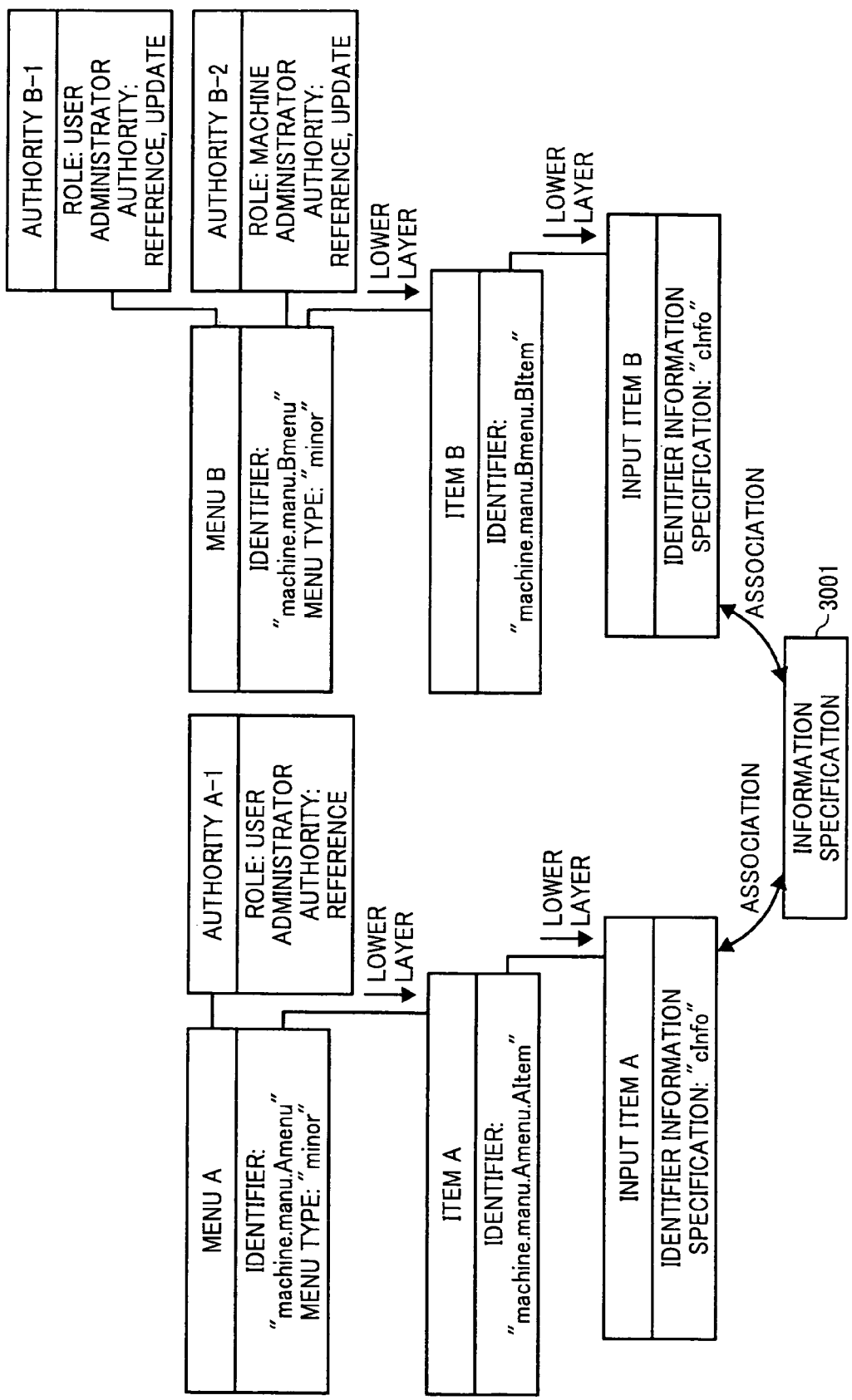
FIG. 30 is a block diagram for explaining a concept in which an object of an information specification is associated with a plurality of screen specifications according to the second embodiment.

The information specifications can be associated with a plurality of screen specifications. FIG. 30 is a block diagram for explaining a concept in which an object of an information specification 3001 is associated with a plurality of screen specifications. A manner of deciding the access right corresponding to the information specification 3001 is described below.

If a first screen specification (item) and a second screen specification (item) are associated with the target information specification, the authority check unit 2312 checks whether the user is authorized from a result of logical operation of the authority that is associated with a first higher screen specification (item) having the menu type "minor" of the first screen specification and the authority that is associated with a second higher screen specification (item) having the menu type "minor" of the second screen specification. Although the authority check unit 2312 performs the logical sum operation in the second embodiment, it is allowable to perform some other logical operations such as the AND operation. As described above, the information specification is used to perform a certain process. In other words, the authority check unit 2312 checks whether the user has the access right to perform the process related to the target item.

In this manner, if there is a plurality of screen specifications associated with the target information specification, the authority check unit 2312 performs the logical sum operation, and checks the access right from the result of the logical sum operation. Thus, it is possible to perform the control access properly even when one information specification is associated with a plurality of screen specifications.

FIG. 31 is a schematic diagram for explaining a concept of a result of the authority check performed by the authority check unit 2312. When the authority check unit 2312 checks the access right corresponding to the information specification 3001, the authority check unit 2312 performs the logical sum operation of an authority A-1, which is associated with a menu A as one of the hither items of the information specification 3001, and an authority B-1, which is associated with a menu B as the other hither item of the information specification 3001. More particularly, the authority check unit 2312 performs the logical sum operation of "reference" of the authority A-1 and "reference" and "update" of the authority B-1, thereby determining that the authority corresponding to the information specification 3001 is "reference" and "update".

Figure 32:
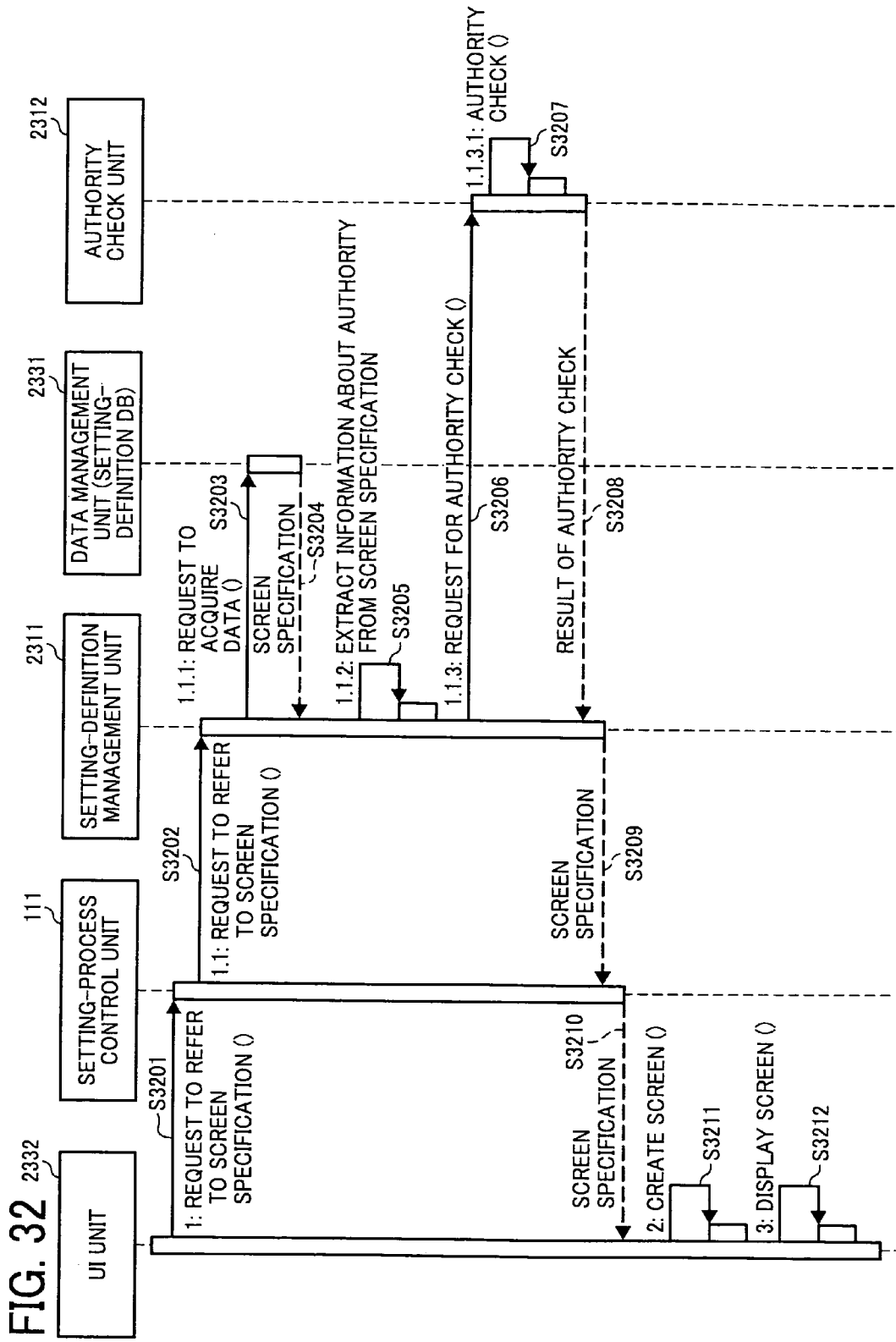
FIG. 32 is a sequence diagram of a process in which the image processing apparatus displays the setting screen according to the second embodiment.

FIG. 32 is a sequence diagram of a process in which the image processing apparatus 2300 displays the setting screen.

When the instruction receiving unit 134 receives a certain instruction from the user by means of, for example, pressing of a button, the UI unit 2332 requests the setting-process control unit 111 to refer to the screen specification (Step S3201). More particularly, the UI unit 2332 sends the identifier corresponding to the selected or pressed item, the role of the login user, and the action to be taken as arguments. In the example shown in FIG. 32, because the user wishes to display the setting screen, the action to be taken is "reference".

The setting-process control unit 111 requests the setting-definition management unit 2311 to refer to the screen specification (Step S3202). More particularly, the setting-process control unit 111 sends the identifier corresponding to the selected or pressed item, the role of the login user, and the action to be taken as the arguments.

In response to the request, the display-item selecting unit 123, which is included in the data control unit 120 of the setting-definition management unit 2311, selects an item to be included in the setting screen to be displayed by the identifier that is received as the argument. The data control unit 120 instructs the data management unit 2331 to acquire the screen specification data corresponding to the identifier of the selected item (Step S3203).

In response to the instruction, the data management unit 2331 sends the screen specification data corresponding to the selected item to the setting-definition management unit 2311 (Step S3204).

After that, the data control unit 120 of the setting-definition management unit 2311 extracts information about the access right from the received screen specification data (Step S3205). A manner of acquiring the access right will be described later.

The data control unit 120 then sends the extracted information about the access right to the authority check unit 2312, thereby requesting the authority check (Step S3206). The authority check unit 2312 checks whether the user is authorized to refer to or edit the screen specification data from the received information about the authority (Step S3207).

The authority check unit 2312 sends a result of the authority check to the setting-definition management unit 2311 (Step S3208).

Upon receiving the result of the authority check, the data control unit 120 of the setting-definition management unit 112 sends the screen specification data which the user is allowed for reference, update, or execution to the setting-process control unit 111 along with the result of the authority check (Step S3209).

The setting-process control unit 111 sends the received screen specification data to the UI unit 2332 (Step S3210).

The screen creating unit 135 of the UI unit 2332 creates the setting screen data in which the display form of each item is properly defined based on the received screen specification data and the result of the authority check (e.g., editable or non-editable) (Step S3211). The display unit 137 then displays the created setting screen (Step S3212).

Figure 33:
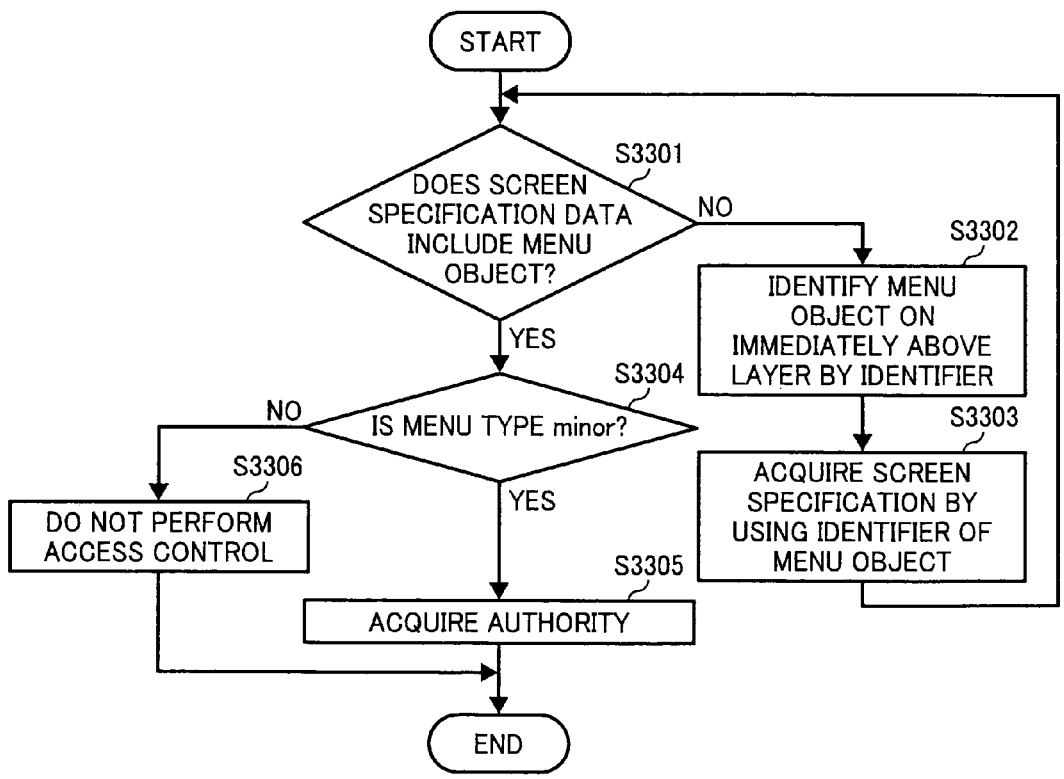
FIG. 33 is a flowchart of a process of acquiring the authority corresponding to the screen specification data according to the second embodiment.

FIG. 33 is a flowchart of a process in which the data control unit 120 of the setting-definition management unit 2311 acquires the authority corresponding to the target screen specification data.

The data control unit 120 determines whether the target screen specification data includes a menu object (Step S3301).

If the data control unit 120 determines that the target screen specification data includes no menu object (No at Step S3301), the data control unit 120 identifies the menu object that is on the immediately above layer by the identifier included as the attribute data in the target screen specification data (Step S3302). The target screen specification data that includes no menu object must include an item object, and the item object must be assigned to an identifier. Therefore, the data control unit 120 can identify the menu object that is on the immediately above layer by the identifier of the item object.

After identifying the menu object that is on the immediately above layer (acquiring the identifier of the menu object), the data control unit 120 acquires the screen specification data corresponding to the menu object by using the identifier of the menu object (Step S3303). After that, the process control returns to Step S3301, and the data control unit 120 determines whether the acquired screen specification data includes a menu object.

On the other hand, if the data control unit 120 determines that the target screen specification data includes a menu object (Yes at Step S3301), the data control unit 120 determines whether the menu type, which is the attribute data of the menu object, is "minor" (Step S3304). If the data control unit 120 determines that the menu type is not "minor" (No at Step S3304), the data control unit 120 determines that the target screen specification data is not to be subjected to the access control (Step S3306). The data control unit 120 does not request the authority check unit 2312 to perform the authority check for the screen specification data.

On the other hand, if the data control unit 120 determines that the menu type is "minor" (Yes at Step S3304), the data control unit 120 acquires information about the authority (the role and the access right) from the menu access-right object that is associated with the menu object (Step S3305). The data control unit 120 sends the acquired information about the authority to the authority check unit 2312.

Thus, the data control unit 120 extracts the access right assigned to the target screen specification data. In this manner, even if the access right is assigned to only the items that are categorized to the third group, it is possible to perform the access control on the screen specification data basis.

Figure 34:
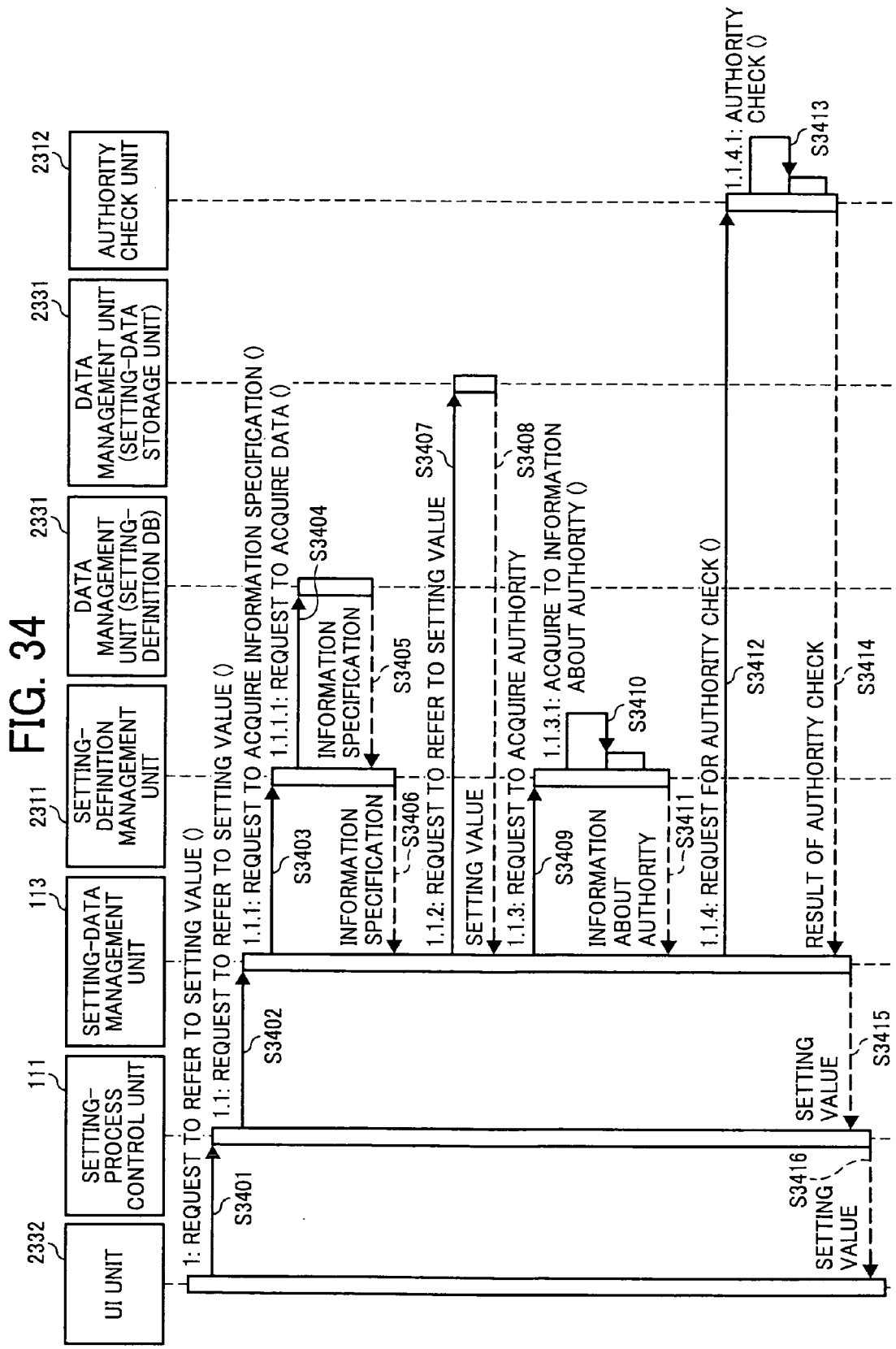
FIG. 34 is a sequence diagram of a process of acquiring a setting value necessary for a certain process according to the second embodiment.

In the image processing apparatus 2300, to perform a certain process, it is necessary to acquire a corresponding setting value. FIG. 34 is a sequence diagram of a process in which the image processing apparatus 2300 acquires the setting value necessary for the certain process.

The UI unit 2332 requests the setting-process control unit 111 to refer to the target setting value (Step S3401). More particularly, the UI unit 2332 sends the identifier corresponding to the information specification that is associated with the target setting value, the role of the login user, and the action to be taken as the arguments. In the example shown in FIG. 34, the action to be taken is "reference".

The setting-process control unit 111 requests the setting-data management unit 113 to refer to the information specification that is associated with the target setting value (Step S3402). More particularly, the setting-process control unit 111 sends the identifier corresponding to the information specification that is associated with the target setting value, the role of the login user, and the action to be taken as the arguments.

The setting-data management unit 113 requests the setting-definition management unit 2311 to refer to the information specification (Step S3403). More particularly, the setting-data management unit 113 sends the identifier corresponding to the information specification, the role of the login user, and the action to be taken as the arguments.

After that, the data control unit 120 of the setting-definition management unit 2311 requests the data management unit 2331 to acquire the information specification data corresponding to the identifier that is received as the argument (Step S3404). In response to the request, the data management unit 131 acquires the information specification corresponding to the identifier from the setting-definition DB 2341.

The data management unit 2331 then sends the acquired information specification data to the data control unit 120 of the setting-definition management unit 2311 (Step S3405). Upon receiving the information specification data, the data control unit 120 sends the received information specification data to the setting-data management unit 113 (Step S3406).

After that, the setting-data management unit 113 requests the data management unit 2331 to refer to the target setting value associated with the received information specification data (Step S3407). In response to the request, the data management unit 2331 acquires the target setting value from the setting-data storage unit 136, and sends the acquired setting value to the setting-data management unit 113 (Step S3408).

After that, the setting-data management unit 113 requests the setting-definition management unit 2311 to acquire the access right to access the target setting value (Step S3409). More particularly, the setting-data management unit 113 sends the acquired information specification data as the argument.

The data control unit 120 of the setting-definition management unit 2311 acquires the access right to access the target setting value based on the received information specification data (Step S3410). The process of acquiring information about the authority will be described later.

The data control unit 120 sends information about the access right to access the target setting value to the setting-data management unit 113 (Step S3411).

The setting-data management unit 113 sends the received information about the authority to the authority check unit 2312, thereby requesting the authority check unit 2312 to perform the authority check (Step S3412). The authority check unit 2312 performs the authority check for the screen specification data by using the received information about the authority (Step S3413).

After that, the authority check unit 2312 sends a result of the authority check to the setting-data management unit 113 (Step S3414).

If it is determined from the result of the authority check that the user is authorized to access the target setting value, the setting-data management unit 113 sends the result of the authority check and the target setting value to the setting-process control unit 111 (Step S3415).

Upon receiving the result of the authority check and the target setting value, the setting-process control unit 111 sends the received result of the authority check and the received target setting value to the UI unit 2332 (Step S3416). Thus, the UI unit 2332 acquires the target setting value necessary for the process or the like.

Figure 35:
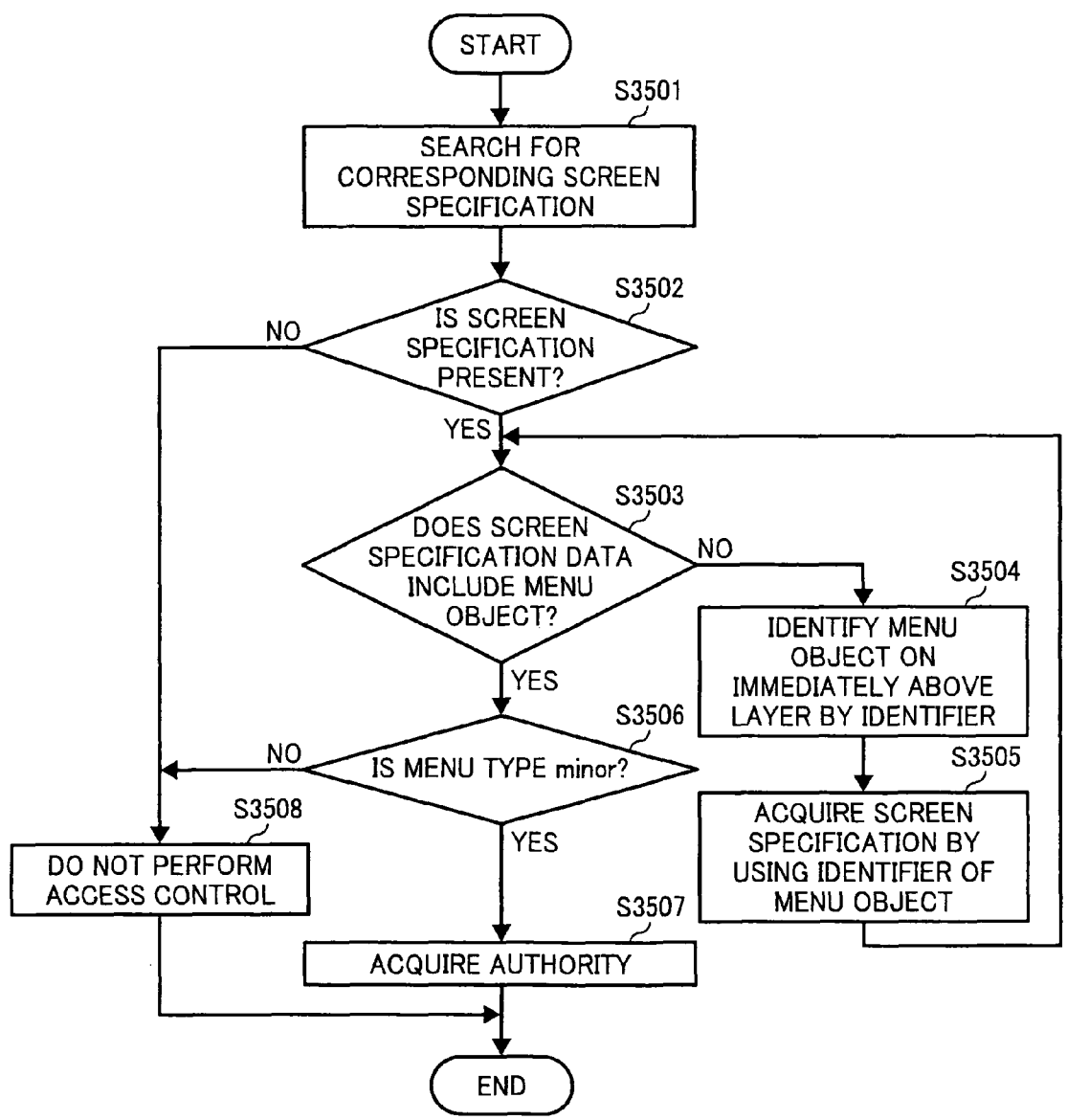
FIG. 35 is a flowchart of a process of acquiring the authority corresponding to the setting value according to the second embodiment.

FIG. 35 is a flowchart of a process in which the data control unit 120 of the setting-definition management unit 2311 acquires the authority corresponding to the target setting value.

The data control unit 120 of the setting-definition management unit 2311 causes the data management unit 2331 to search the setting-definition DB 2341 for the screen specification data associated with the received information specification data (Step S3501). More particularly, the data control unit 120 compares the information specification identifier that is included as the attribute data in the item specification object of the screen specification data with the identifier corresponding to the received information specification data. If the information specification identifier of the screen specification data is matched with the identifier of the received information specification data, the data control unit 120 determines that the screen specification data is associated with the received information specification data.

The data control unit 120 determines whether the screen specification data associated with the received information specification data is present from a result of the search (Step S3502). If the screen specification data associated with the received information specification data is not present (No at Step S3502), the data control unit 120 determines no screen specification is to be submitted to the access control (Step S3508). The data control unit 120 does not request the authority check unit 2312 to perform the authority check for the screen specification data.

If the screen specification data associated with the received information specification data is present (Yes at Step S3502), the data control unit 120 acquires the information about the authority (the role and the access right) corresponding to the target screen specification data in the same manner as from Step S3301 to Step S3306 (Step S3503 to Step S3508). The data control unit 120 sends the acquired information about the authority to the authority check unit 2312.

In this manner, the image processing apparatus 2300 acquires the authority corresponding to the target setting value. If it is determined from the acquired authority that the user is authorized to access the target setting value, the user can perform the certain process by using the target setting value.

The image processing apparatus 2300 can be configured to create, when searching for the item of the screen specification data associated with the information specification data, an index of each information specification identifier that is used as a keyword for the search. This improves the search performance.

Figure 36:
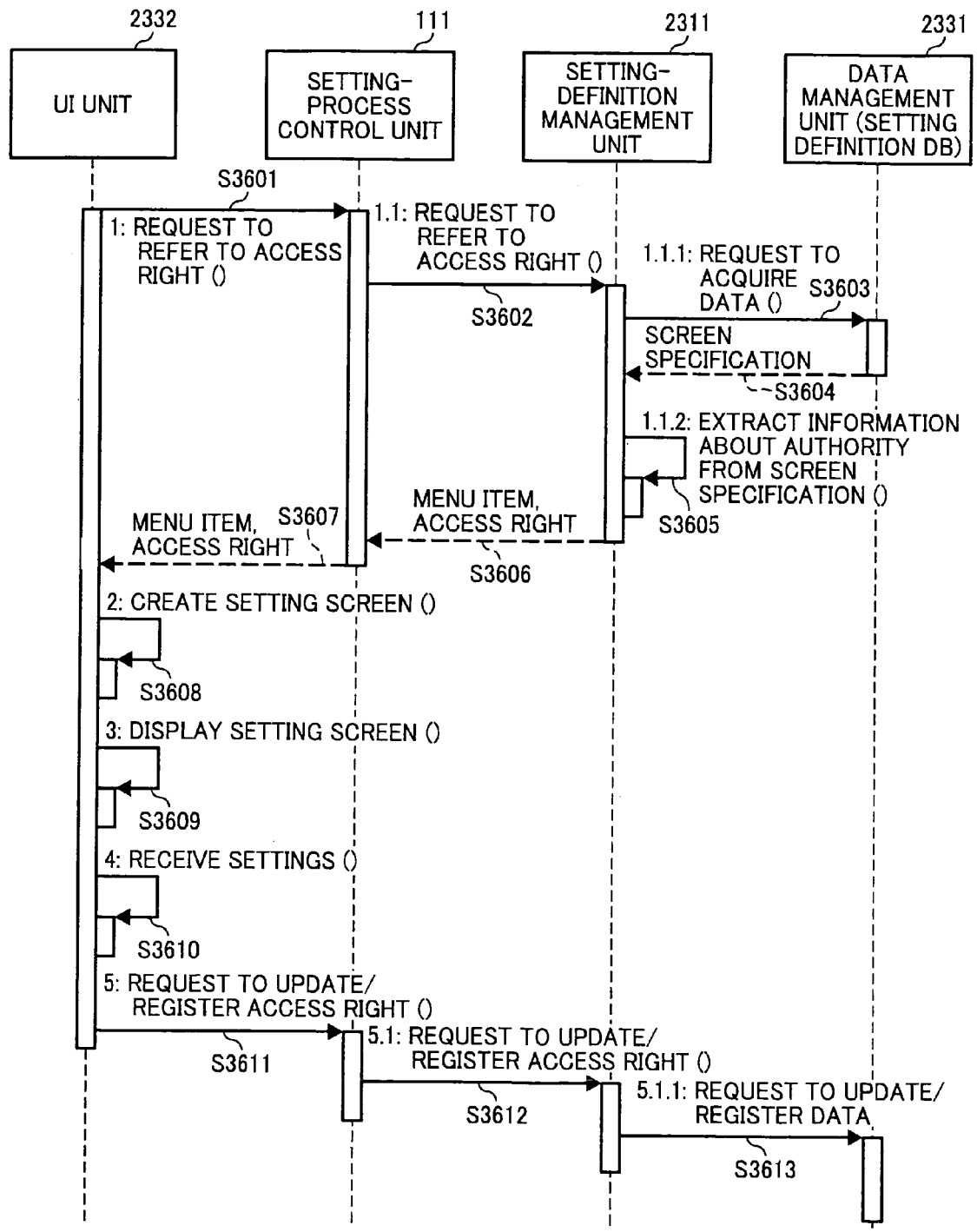
FIG. 36 is a sequence diagram of a process of registering or updating the authority that is assigned to each of the menu items that are categorized to a certain group according to the second embodiment.

FIG. 36 is a sequence diagram of a process in which the image processing apparatus 2300 individually register or update the authority assigned to each of the menu items that are categorized to the third group.

The UI unit 2332 requests the setting-process control unit 111 to refer to the access right (Step S3601). The setting-process control unit 111 requests the setting-definition management unit 2311 to refer to the access right (Step S3602).

After that, the data control unit 120 of the setting-definition management unit 2311 requests the data management unit 2331 to acquire the screen specification data corresponding to the menu object having the menu type "minor" (Step S3603). In response to the request, the data management unit 2331 sends the screen specification data to the setting-definition management unit 2311 (Step S3604).

The data control unit 120 of the setting-definition management unit 2311 extracts the information about the authority from the acquired screen specification data and the menu access-right object associated with the menu object (Step S3605).

The data control unit 120 sends the extracted information about the authority and the menu item having the menu type "minor" to the setting-process control unit 111 (Step S3606).

After that, the setting-process control unit 111 sends the extracted information about the authority and the menu item having the menu type "minor" to the UI unit 2332 (Step S3607).

The UI unit 2332 creates the screen for authority settings from the received information about the authority and the menu item that is categorized to the third group (Step S3608). The UI unit 2332 creates, for example, the setting screen shown in FIG. 29. The display unit 137 displays the created setting screen on the control panel 20 (Step S3609).

After that, the setting receiving unit 2352 receives settings about the authority of each menu item via the setting screen (Step S3610).

The setting receiving unit 2352 then requests the setting-process control unit 111 to update or register the access right corresponding to each menu item (Step S3611). The setting receiving unit 2352 sends the display name of the menu item and the type of the role corresponding to the access right to be updated in addition to the access right as the arguments.

The setting-process control unit 111 requests the setting-definition management unit 2311 to update or register the access right corresponding to the menu item (Step S3612). More particularly, the setting receiving unit 2352 sends the display name of the menu item and the type of the role corresponding to the access right to be updated in addition to the access right as the arguments.

The data control unit 120 of the setting-definition management unit 2311 requests the data management unit 2331 to register or update the access right corresponding to the menu item (Step S3613). In response to the request, the data management unit 2331 registers or updates the access right of the menu access-right object that is associated with the menu object having the menu type "minor" and the menu item "display name". If the menu object is associated with a plurality of menu access-right objects, a one to be updated or registered is identified from among the menu access-right objects by the user's role.

In this manner, the access right that is assigned to each menu item categorized to the third group can be updated or registered independently.

In the image processing apparatus 2300 according to the second embodiment, the access right is assigned to only the screen specification categorized to the certain group (i.e., the screen specification the menu type "minor"). This facilitates editing by the user of the authority corresponding to each item of the setting screen. Moreover, because the access right is assigned to not each of the screen specifications and the information specifications but only items categorized to the predetermined group (item having the menu type "minor"), the total amount of data about the authority is reduced.

Moreover, because the authority check unit 2312 determines on the item-to-item basis whether the user is authorized to access the menu item by referring to the access right that is assigned to each of the user's roles, the image processing apparatus 2300 performs access control properly.

Furthermore, the user can update or register the access right corresponding to the menu item via the setting screen, which facilitates editing by the user of the authority corresponding to the setting item.

The image processing apparatus 2300 can perform the authority check, such as the access check, even for the information specification data by using the authority that is assigned to the screen specification data. The image processing apparatus 2300 can perform the authority check for the setting value in the same manner.

Moreover, if the screen specification corresponding to the target information specification is not present, the setting data that is defined by the target information specification is not be subjected to the access control. This ensures the high access availability.

Furthermore, it is possible to identify, from information about a lower level item, the menu item categorized to the third group corresponding to the lower level item. Therefore, even if the access right is set to the menu item categorized to the third group, it is possible to perform the access control for the lower level item.

Moreover, the image processing apparatus 2300 can identifies, form the target information specification data, the screen specification data associated with the target information specification data. Therefore, even if the access right is set to the menu item categorized to the third group, it is possible to perform the access control for the setting data, such as the setting value, of the target information specification data.

Figure 37:
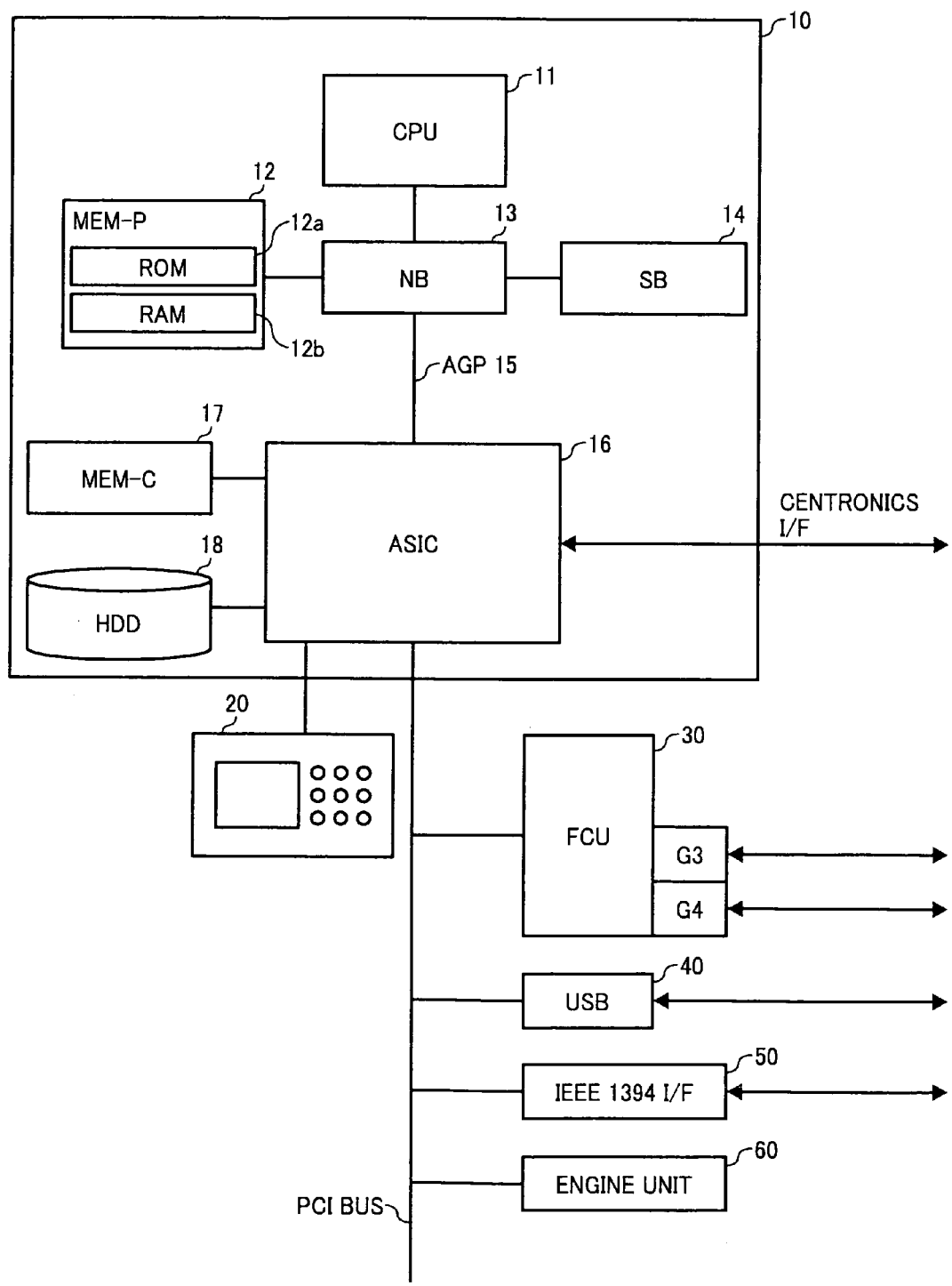
FIG. 37 is a block diagram of the hardware configuration of the image processing apparatus shown in FIG. 1.

FIG. 37 is a block diagram of the hardware configuration of the image processing apparatus 100. The image processing apparatus 100 includes a controller 10 and an engine unit 60 connected to each other via a peripheral component interconnect (PCI) bus. The controller 10 controls operation of the image processing apparatus 100, drawing, communications, and inputs via the control panel 20. The engine unit 60 is a printer engine or the like connectable to the PCI bus. The engine unit 60 can be, for example, a black-and-white plotter, a single-drum color plotter, a four-drum color plotter, a scanner, and a facsimile unit. The engine unit 60 includes an engine device such as a plotter or the like and an image processing device that performs various processing such as error diffusion and gamma transformation.

The controller 10 includes a central processing unit (CPU) 11, a north bridge (NB) 13, a system memory (MEM-P) 12, a south bridge (SB) 14, a local memory (MEM-C) 17, an application specific integrated circuit (ASIC) 16, and a hard disk drive (HDD) 18. The NB 13 is connected to the ASIC 16 via an accelerated graphics port (AGP) bus 15. The MEM-P 12 includes a read only memory (ROM) 12*a* and a random access memory (RAM) 12*b*.

The CPU 11 controls operation of the image processing apparatus 100. The CPU 11 is connected to the units of the image processing apparatus 100 via chipsets such as the NB 13, the MEM-P12, and the SB 14.

The NB 13 is used to connect the CPU 11 to the MEM-P 12, the SB 14, and the AGP bus 15. The NB includes a memory controller, a PCI master, and an AGP target. The memory controller controls read operation or write operation from or to the MEM-P 12.

The MEM-P 12 is used for storing therein various computer programs and data, loading thereon various computer programs data, and writing thereto images in the printer mode. The MEM-P 12 includes the ROM 12*a* and the RAM 12*b*. The ROM 12*a* is used for storing therein various computer programs and data. The RAM 12*b* is a writable/readable memory that is used for loading thereon various computer programs data and writing thereto images in the printer mode.

The SB 14 is used to connect the NB 13 to PCI devices and peripheral devices. The SB 14 is connected to the NB 13 via the PCI bus. A network interface unit (I/F) or the like is connected to the PCI bus.

The ASIC 16 includes a hardware component for image processing. The ASIC 16 is used as a bridge to connect the AGP bus 15, the PCI bus, the HDD 18, and the MEM-C 17 to each other. The ASIC 16 includes a PCI target, an AGP master, an arbiter as a main unit of the ASIC 16, a memory controller that controls the MEM-C 17, a plurality of direct memory access controllers (DMACs) that rotates the image data, etc., based on a hardware logic, and a PCI unit that sends/receives data to/from the engine unit 60 via the PCI bus. The ASIC 16 is connected to a facsimile control unit (FCU) 30, a universal serial bus (USB) 40, and an IEEE 1394 I/F 50.

The MEM-C 17 is used as a buffer for copy image data and codes. The HDD 18 is used as a storage unit that stores therein image data, various computer programs, font data, and form data.

The AGP bus 15 is a bus I/F for a graphics accelerator card. The AGP bus 15 directly accesses the MEM-P 12 at a high throughput, thereby allowing the graphic accelerator card to process graphics at high speed.

An information processing program that the image processing apparatus 100 executes is provided in a state preinstalled into a recording medium such as a ROM.

The information processing program can be stored, in a form of a file that is installable and executable on the image processing apparatus 100, in a recording medium readable by the image processing apparatus 100, such as a compact disk-read only memory (CD-ROM), a flexible disk (FD), a compact disk-recordable (CD-R), and a digital versatile disk (DVD).

On the other hand, the information processing program can be stored in another computer connected to the image processing apparatus 100 via a network such as the Internet, and downloaded to the image processing apparatus 100 via the network. The information processing program can be delivered or distributed via a network such as the Internet.

The information processing program is, for example, made up of modules that implement the units of the image processing apparatus 100, such as the operating layer, the device layer, the service layer, and the application layer, as software. When the CPU 11 reads the information processing program from the ROM 12*a* and executes the read information processing program, the above modules are loaded and created on a main memory thereby implementing the units of the image processing apparatus 100.

According to one aspect of the present invention, when an item to be displayed on a certain screen is additionally installed, the item is registered associated with an order of screens to be displayed before the certain screen, as a result of which the certain screen appears with the item thereon. In this manner, operation required for adding the item to the certain screen is simplified, which reduces a workload for creating the certain screen.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A screen processing apparatus comprising:
a storage unit that stores therein an item to be displayed on a display screen and a display order indicating a screen transition until the display screen is displayed in a hierarchical structure in association with each other;
an authority storage unit that stores therein the item and an access right to the item in association with each other
an input processing unit that inputs screen definition data including an additional item to be added to the display screen and the display order until the additional item is displayed in the display screen;
a registering unit that registers the display order and the additional item included in the screen definition data in the storage unit in association with each other;
a creating unit that creates the display screen including the display order representing the display screen and the item and the additional item associated with the display order in the storage unit; and
an authority determining unit that determines, when creating the display screen, whether there is an authority to access the item to be displayed on the display screen based on the authority associated with an upper-layer item in the hierarchical structure of the display order corresponding to the item to be displayed, the authority determining unit further determines whether there is an authority to access setting data used in a process to be executed based on the item corresponding to the process and the authority associated with the upper-layer item, and when there is a plurality of items associated with the process to be executed according to the displayed item, the authority determining unit further determines whether there is an authority to access the process based on a result of a logical operation of authorities associated with a respective upper-layer item of the items associated with the process, wherein the creating unit creates the display screen including the item to be displayed based on the result of determination of the authority determining unit.

2. The screen processing apparatus according to claim 1, wherein the authority storage unit stores therein items of a predetermined number of layers from an upper-most layer in the display order in association with the authority.

3. The screen processing apparatus according to claim 1, further comprising:
a receiving unit that receives a setting of the authority for each item;
and an authority registering unit that registers the setting of the authority for each item to be set in the authority storage unit.

4. The screen processing apparatus according to claim 1, further comprising a format determining unit that determines whether the screen definition data input by the input processing unit satisfies a predetermined format required to register the screen definition data in the storage unit, wherein
the registering unit registers the screen definition data that is determined to satisfy the predetermined format by the format determining unit in the storage unit.

5. The screen processing apparatus according to claim 1, further comprising a search unit that searches either one of the item and the additional item, wherein
the creating unit creates the display screen including either one of the item and the additional item searched by the search unit.

6. The screen processing apparatus according to claim 1, wherein
the storage unit further stores therein attribute data required to execute a process that uses the item for each item,
the input processing unit further inputs information definition data including the attribute data for each item,
the registering unit further registers the attribute data in the storage unit based on input information definition data for each item.

7. The screen processing apparatus according to claim 6, wherein the storage unit stores therein data that defines a settable range for each item as the attribute data, and
the screen processing apparatus further comprises:
an instruction receiving unit that receives setting data to be set for each item;
a setting determining unit that determines whether the setting data set in the item is within the settable range; and
a setting unit that sets, when the setting data set in the item is determined to be within the settable range by the setting determining unit, the setting data received by the instruction receiving unit as setting data for executing the process that uses the item.

8. A method of processing information in a screen processing apparatus including a storage unit that stores therein an item to be displayed on a display screen and a display order indicating a screen transition until the display screen is displayed in a hierarchical structure in association with each other, the method comprising:
inputting screen definition data including an additional item to be added to the display screen and the display order until the additional item is displayed in the display screen;
storing the item and an access right to the item in association with each other
registering the display order and the additional item included in the screen definition data in the storage unit in association with each other;
determining whether there is an authority to access the item to be displayed on the display screen based on the authority associated with an upper-layer item in the hierarchical structure of the display order corresponding to the item to be displayed;
determining whether there is an authority to access setting data used in a process to be executed based on an item corresponding to the process and the authority associated with the upper-layer item;
determining, when there is a plurality of items associated with a process to be executed according to the displayed item, whether there is an authority to access the process based on a result of a logical operation of authorities associated with a respective upper-layer item of the items associated with the process; and
creating the display screen including the display order representing the display screen and the item and the additional item associated with the display order in the storage unit based on the result of each of the determining steps.

9. A computer program product comprising a computer-usable medium having computer-readable program codes embodied in the medium for processing information in a screen processing apparatus including a storage unit that stores therein an item to be displayed on a display screen and a display order indicating a screen transition until the display screen is displayed in a hierarchical structure in association with each other, the program codes when executed cause a computer to execute:

inputting screen definition data including an additional item to be added to the display screen and a display order until the additional item is displayed in the display screen;

storing the item and an access right to the item in association with each other;

registering the display order and the additional item included in the screen definition data in the storage unit in association with each other;

determining whether there is an authority to access an item to be displayed on the display screen based on the authority associated with an upper-layer item in the hierarchical structure of the display order corresponding to the item to be displayed;

determining whether there is an authority to access setting data used in a process to be executed based on an item corresponding to the process and the authority associated with the upper-layer item;

determining, when there is a plurality of items associated with a process to be executed according to a displayed item, whether there is an authority to access the process based on a result of a logical operation of authorities associated with a respective upper-layer item of the items associated with the process; and creating a display screen including a display order representing the display screen and the item and the additional item associated with the display order in the storage unit based on a result of each of the determining steps.

* * * * *